(12) United States Patent
Shmid et al.

(10) Patent No.: US 6,530,078 B1
(45) Date of Patent: Mar. 4, 2003

(54) VIRTUAL MACHINES IN OS/390 FOR EXECUTION OF ANY GUEST SYSTEM

(76) Inventors: Alexander V. Shmid, 244-15 Albiana Street, Moscow 125252 (RU); Viatcheslav V. Naumov, 583-2-12 Sumskoi Proezd, Moscow 113203 (RU)

( * ) Notice: Subject to any disclaimer, the term of this patent is extended or adjusted under 35 U.S.C. 154(b) by 0 days.

(21) Appl. No.: 09/280,126

(22) Filed: Mar. 26, 1999

Related U.S. Application Data

(60) Provisional application No. 60/079,427, filed on Mar. 26, 1998, and provisional application No. 60/126,176, filed on Mar. 25, 1999.

(51) Int. Cl.[7] .............................................. G06F 9/45
(52) U.S. Cl. ........................ 717/138; 717/139; 709/1; 703/27; 710/36
(58) Field of Search .............................. 717/138, 139; 709/1, 100, 102–104; 712/209; 711/173, 203; 710/263, 36; 703/27, 23

(56) References Cited

U.S. PATENT DOCUMENTS

| | | | |
|---|---|---|---|
| 4,779,188 A | * 10/1988 | Gum et al. | 709/1 |
| 5,381,535 A | * 1/1995 | Gum et al. | 709/105 |
| 5,414,851 A | * 5/1995 | Brice, Jr. et al. | 709/104 |
| 5,426,748 A | * 6/1995 | Brenza et al. | 711/203 |
| 5,459,872 A | * 10/1995 | Connell et al. | 710/263 |
| 6,253,224 B1 | * 6/2001 | Brice, Jr. et al. | 709/1 |

FOREIGN PATENT DOCUMENTS

EP  0145960 A2 * 6/1985

OTHER PUBLICATIONS

Interpretive Information Systems, Inc., "Virtual Machines in OS/390 for Execution of any Guest System", 1998, pp. 1–48.*

Interpretive Information Systems, Inc., "The Interpretive Space Executive/390 ISX/390TM Vesion 1 Release 2 for The OS/390 Operating System—User's Guide and Reference," 1998, pp. 1–71.*

* cited by examiner

Primary Examiner—Tuan Q. Dam
(74) Attorney, Agent, or Firm—Ellis & Venable, PC

(57) ABSTRACT

A method and system comprising a single IBM S/390 computer architecture running an OS/390 operating system, and at least two guest systems executing within the S/390 computer architecture. Each guest system comprising an execution space, allocated within the virtual memory space of the S/390 computer architecture, in which a guest program or operating system may be executed. Each guest system is configured such that if a Start Interpretive Execution instruction in invoked, the instruction is interpreted and a corresponding function is performed in its place to simulate, for the guest program or operating system, the effect of the IBM S/390 computer architecture. Control is then returned to the guest system at the next instruction after the Start Interpretive Execution instruction, thus allowing the guest program or operating system to execute transparently.

2 Claims, 26 Drawing Sheets

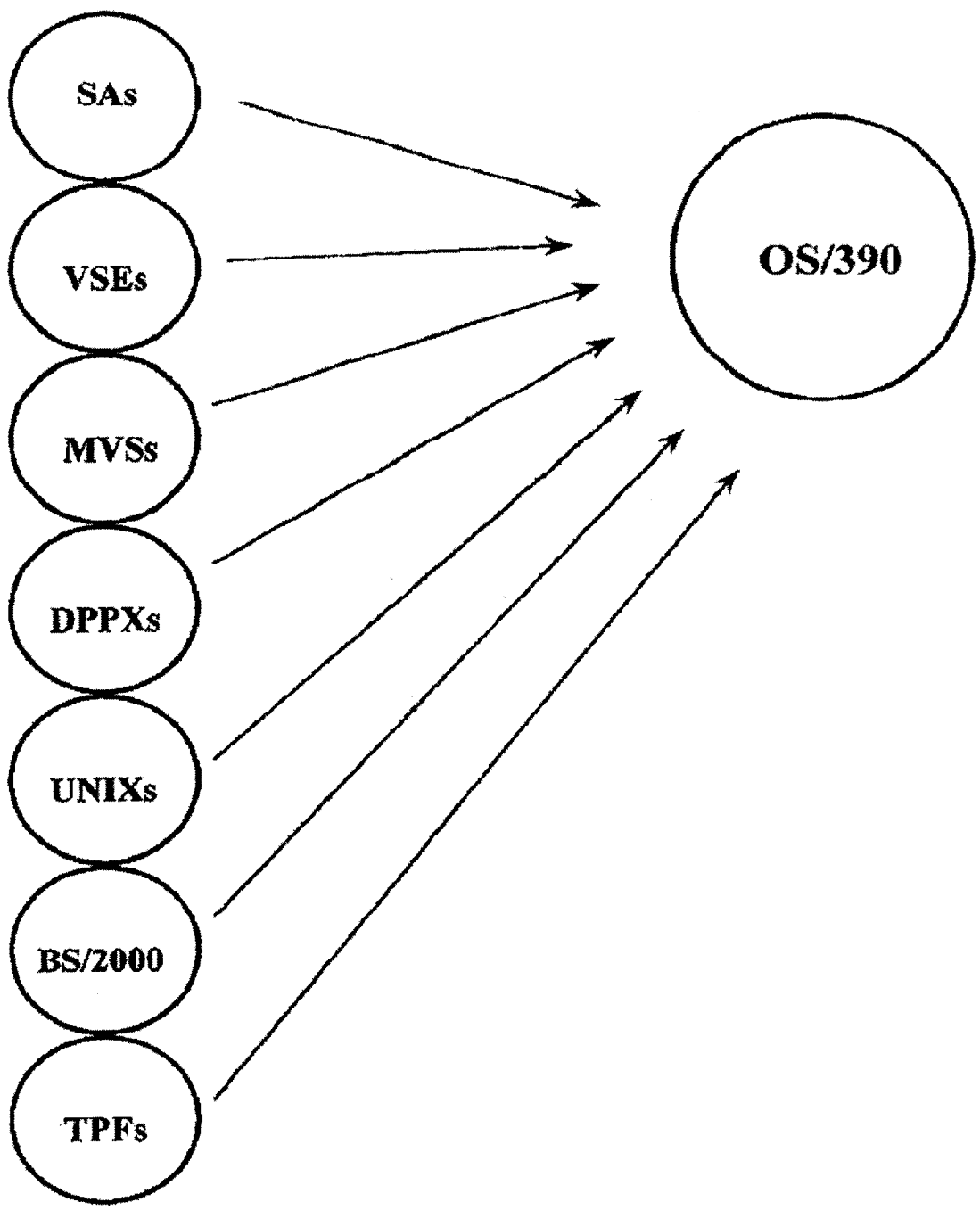
FIG. 1.1

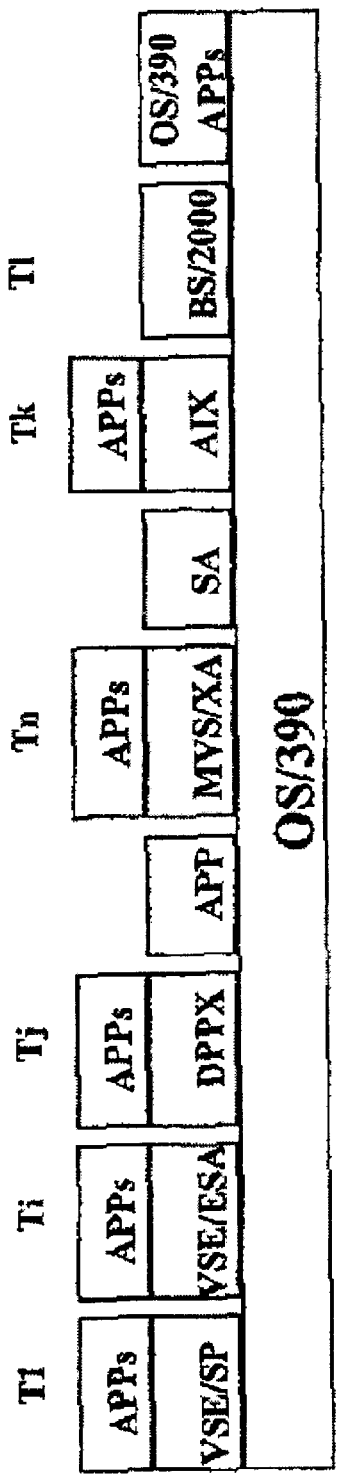
FIG. 1.2

WHAT IS ISX?
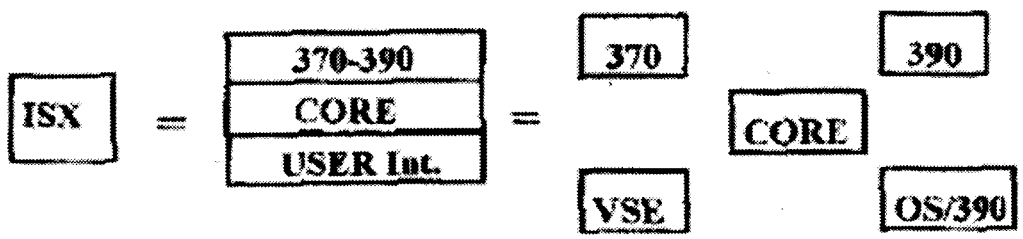
FIG. 2-1(A)
Target: to run any 390-370 guest OS as tasks of OS/390/VSE.
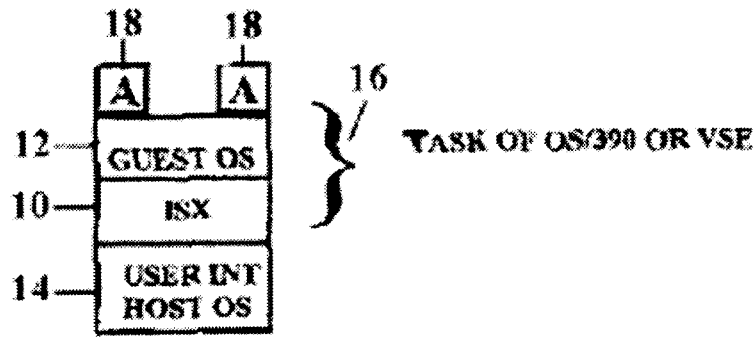
FIG. 2-1(B)
- Tested by IBM
- Few tracks of DASD Memory
- Main memory, few segments
- V = R (VM) overhead for GUEST
- No overhead for HOST
- Reliable, 2 hour training
FIG. 2-1

CTC - connections

Aim: to communicate between GUEST and HOST tasks
in NEW environment
(OLD NETWORKs maintained in GUEST are valid)

A1-A2 - agents - native tasks, developed to communicate
between GUEST and HOST TASKs
CTC - channel to channel
VCTC - virtual CTC
N1-N2 - native applications
G1-G3 - applications in ANY GUEST SYSTEM with CTC maintained

FBA - DASD emulation on CKD

VFBA - virtual FBA DASD on VSAM

Performance dramatically increases on the same CPU
(number of virtual FBA I/Os > number of
physical VSAM CKD I/Os)

HOW TO START THE OS/390 GUEST

OS - ANY 370-390 OS.

1. LOAD ISX on DASD (1 cylinder)
2. START ISX as OS/390 user task
3. IPL OS1 as ISX GUEST
4. Use A1 as OS/390 application in LPAR2 concurrently with A1 in LPAR1.

OVERCOMING THE RESTRICTIONS OF THE OLD OS

- Any A gets OLD OS resourses in monopoly
- Any A together with GUEST OS turns to be OS/390 task and can reach Hard and Soft OS/390 resourses, facilities and protocols
- Any A can get separate virtual time (from OS/390 and other GUESTS) to built timing windows or to test Year 2000 dependence.

T1-T2 - OS/390 user tasks (A + DPPX + ISX).

DB COEXISTENCE
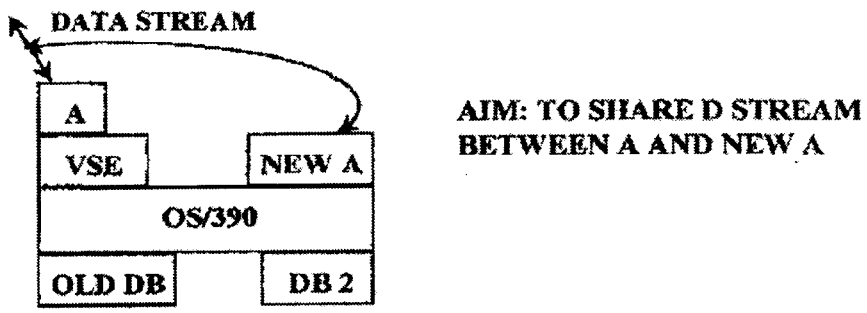
AIM: TO SHARE D STREAM BETWEEN A AND NEW A
1. To extract parts of OLD A
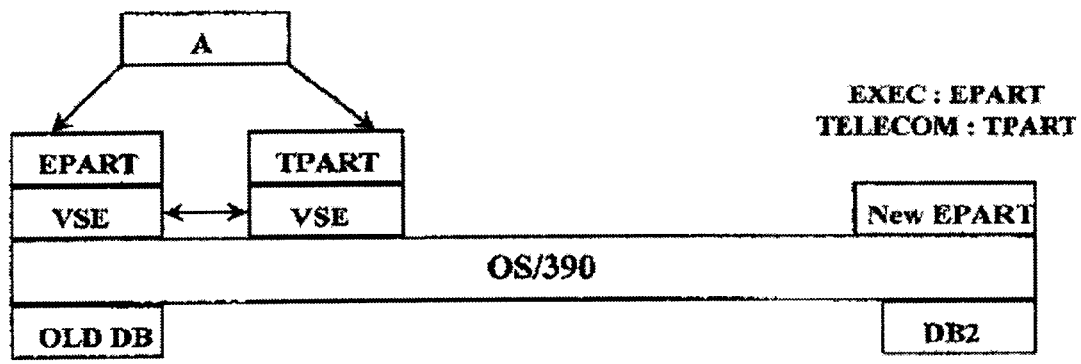
EXEC : EPART
TELECOM : TPART
2.
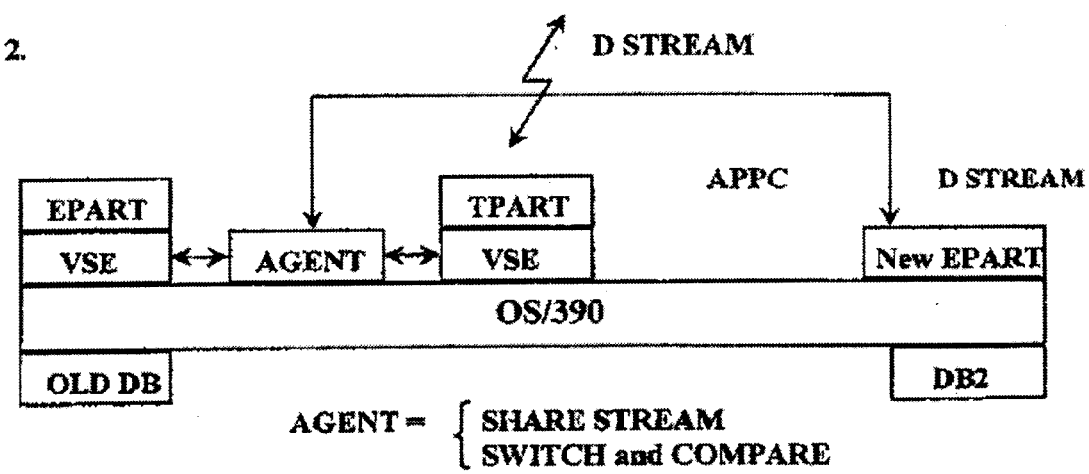
AGENT = { SHARE STREAM
SWITCH and COMPARE
FIG. 9-1

Mobile S/390 GUEST application

OS/390 RACF for DPPX, VSE

T1, T2 - OS/390 TASKs - RACF resources

OS/390 SAF (System Autorization Facility)

Virtual dates

- testing of dates dependences
- creating static and dynamic windows

Any GUEST can get separate date

APPLICATION DEPENDENCE
API
MIDDLEWARE
NETWORKING

OS DEPENDENCE
•TYPE
•VERSION
•SET OF PRODUCTS
 (VERSIONS)
•TUNINGS

| NAME | GUEST TYPE | HOST OS | DASD RESOURCES | MAIN MEMORY |
|---|---|---|---|---|
| ISX\VSE | ANY 370 | VSE 2.1 | Few tracks | Few segments |
| ISX/370 | ANY 370 or SA | OS/390 | | |
| ISX\SA | ANY 390 SA | OS\390 | - | - |
| ISX\DPPX | DPPX and SA | OS\390 | - | - |
| ISX\390 | ANY 390 GUEST without MVS | OS\390 | - | - |
| ISX\MVS | ANY 390 MVS | OS\390 | - | - |
| VFBA | FBA DASD emulation on CKD DASD for VSE and DPPX guests | OS\390 | In ISX resources | One additional segment |
| VCTC | VIRTUAL guest to guest CTC. | OS\390 | In ISX resources | One additional segment |
| LRTE | Local on remote terminal emulation for guest. | OS\390 | In ISX resources | One additional segment |
| VDATE | VIRTUAL DATE for guest | OS\390 | In ISX resources | One additional segment |
| VTIME | VIRTUAL TEMP of time for guest | OS\390 | In ISX resources | One additional segment |

FIG. 17

VIRTUAL MACHINES IN OS/390 FOR EXECUTION OF ANY GUEST SYSTEM

CROSS REFERENCE TO A RELATED APPLICATION

This application claims priority on earlier provisional patent application Serial No. 60/079,427, filed Mar. 26, 1998, which is incorporated herein by reference. This application also claims priority from the provisional patent application, Serial No. 60/126,176 is yet unknown, filed on Mar. 25, 1999, which application is incorporated herein by reference.

FIELD OF THE INVENTION

The invention relates generally to an OS/390 virtual machine. More particularly, the invention relates to a virtual machine allowing fast migration of the applications from any operating system to OS/390.

BACKGROUND OF THE INVENTION

Computer operating systems and independent computer systems or applications (stand-alone programs) are the two main kinds of software products essential for information technology. In the past, with some hardware platforms, if a user needed to use different operating systems and/or independent programs, it was necessary to run them either on different computers or on the same computer one after another, which required shutting down the previous program before loading the subsequent one. An example of such computer architecture was the development of IBM 360–370.

One example of a situation requiring the ability to execute two operating systems of different types or versions simultaneously arises during a migration from an old operating system to a new one. This ability is also needed when one consolidates in one computer center a number of operations previously carried out in separate computer centers with different equipment.

In the past the disadvantage of having to use numerous computers for simultaneously running various operating systems and/or stand alone programs has been dealt with in two ways:

by using special operating systems, such as, for example, IBM's VM operating system, allowing execution of other operating systems as its own tasks; and by logical partitioning (LPAR), which allowed independent execution of different operating systems or stand alone programs on one computer (such as, for example, IBM's LPAR in the 390 architecture).

Although both solutions make it possible to run various operating systems and/or independent programs on one computer, such approaches have a number of drawbacks.

In case of a VM operating system, instead of using additional computers it becomes necessary to use an additional operating system. In other words, one additional resource (extra computers) is substituted by another additional resource (operating system). The VM approach merely substitutes one problem for another—while it saves the use of additional computers, it requires the use of an additional operating system. An illustration of this drawback is the process of migration from an old operating system to a new one using a VM. Instead of using two (new and old) operating systems, the third operating system (VM) becomes involved, which increases costs, requires extensive personnel training and adds to resource requirements.

In case of logical partitioning, there exist the following three drawbacks:

1. A computer can be partitioned into only a limited number of LPARs (15 for IBM 390). However, it is often desirable to be able to execute more different operating systems and/or stand alone programs on one computer, in which case 15 LPARs is simply not enough.
2. Limited access from one operating system to the capabilities of another operating system or stand alone program running simultaneously on the same machine. For example, since LPAR 390 was specifically designed for separating different processes, interaction of operating systems running in different LPARs is basically similar to interaction of operating systems on separate computers.
3. Transition from dynamic resource allocation in case of one operating system to static resource allocation in LPAR, resulting in a loss of the possibility to reallocate available resources during execution. Such a loss results in insufficient exploitation of existing resources and capabilities or in the need to buy additional resources.

It is, therefore, desirable to have a system and method for a fast and efficient migration of the applications from any operating system to OS/390. Thus, there is a need in the art to develop a program and method for executing different operating systems and/or stand alone programs on one machine without using special operating systems or without having to use partitioning.

SUMMARY OF THE INVENTION

The present invention overcomes the drawbacks and disadvantages existing in the art by enabling the execution of any non-OS/390 operating system and its applications as a guest task in the OS/390 environment. Such execution is accomplished by creation of an interpretive space—a virtual storage area of the OS/390 address space used by the present invention in interpretive execution mode of ESA/390.

It is, therefore, an object of the present invention to allow users to execute simultaneously on one computer various operating systems and applications (collectively called "guests") without having to use special operating systems, such as VM, but using an operating system already existing in a computer (such as OS/390 or VSE).

It is another object of the present invention to allow a more flexible resource allocation for guest execution than that of LPAR or VM.

Yet another object of the present invention is to enable guest execution of either IBM or non-IBM 370–390 operating systems in OS/390-VSE on the computers implementing S/390 principles of operation. Among these are all IBM 9672, multipurpose 2000, P/390, R/390 computers.

It is also an object of the present invention to provide for such execution of any guest system on the S/390 platform, which will not require any changes in a host system and in a guest system of any vendor.

It is also an object of the present invention to provide for fast and seamless transition of an application running on any operating system to OS/390, consolidation process based on one machine without LPARs under OS/390 with dynamic resource allocation.

It is yet another object of the present invention to give access to OS/390 system facilities to applications normally executed in other operating systems, such as S/370, and to reduce the average system reaction time on the same equipment (reduction of start-stop time for task execution by transferring I/O from 370 to 390).

In OS/390 address space controlled by the present invention, the OS/390 operating service is replaced by an operating service required by various application programs. Several OS/390 regions can be used by the present invention to run different applications in their own operating environment simultaneously. Running non-OS/390 applications in OS/390 address spaces, controlled by the present invention, lets OS/390 users work with those applications and their operational environment while sharing the OS/390 system resources with other users.

Functionally, the present invention is an OS/390 task, which allows it to use OS/390 capabilities unavailable in VM and LPAR. For example, DPPX and VSE IBM operating systems being executed in the interpretive space provided by the present invention can use virtual FBA (Fixed Block Architecture) disks located on VSAM (Virtual Sequential Access Method) files. Since VSAM files are visible for OS/390, OS/390 technologies can be used for DPPX and VSE disk images and DPPX and VSE files, which is impossible in other cases. Another example is a virtual inernetworking capability between guest systems being executed in OS/390. For instance, various DPPX or VSE guests executed in the interpretive space of the present invention can interact with each other via virtual TRN (Token Ring) without exiting to the physical network.

Compared to LPAR, the number of guest systems executed with the help of the interpretive space of the present invention is not limited to ten per one machine. Dynamic resource allocation is more efficient among OS/390 tasks (guest systems under ISX) than between LPARs. DPPX and VSE operating systems together with their applications become executable in OS/390 SYSPLEX (a multi-computer complex).

Compared to VM, ISX's requirements for various resources, including maintenace, are very insignificant. ISX needs several segments of the main storage and several volume tracks.

The execution of applications with their own operational services is essentially simplified due to OS/390 resource allocation and control facilities, and the device emulation facilities provided by the present invention. Implementation of the present invention takes full advantage of the ESA/390 Interpretive Execution Mode.

Any operating system (except VM/ESA) together with applications could be executed in the virtual machine created by the present invention. At the same time it is possible to start some independent virtual machines in OS/390, in which different operating systems (for instance, DPPX, VSE) could be executed as OS/390 tasks. Therefore, the OS/390 functionality becomes accessible for other systems. The present invention provides virtual facilities for disks, networks and terminals, creating a possibility to transfer the processing to other geographical locations (transferability/mobility).

The present invention is used to achieve fast and inexpensive outsourcing, such as guest executing of non-OS/390 operating systems and tasks in OS/390, consolidation of various information technologies on OS/390 (for example, transfer of DPPX, VSE, MVS execution to OS/390), fast migration to OS/390, resulting in consolidation of computing equipment.

These and other advantages of the present invention will be more readily apparent from the detailed description of the invention and the accompanying drawings.

BRIEF DESCRIPTION OF THE DRAWING FIGURES

Figure 1:
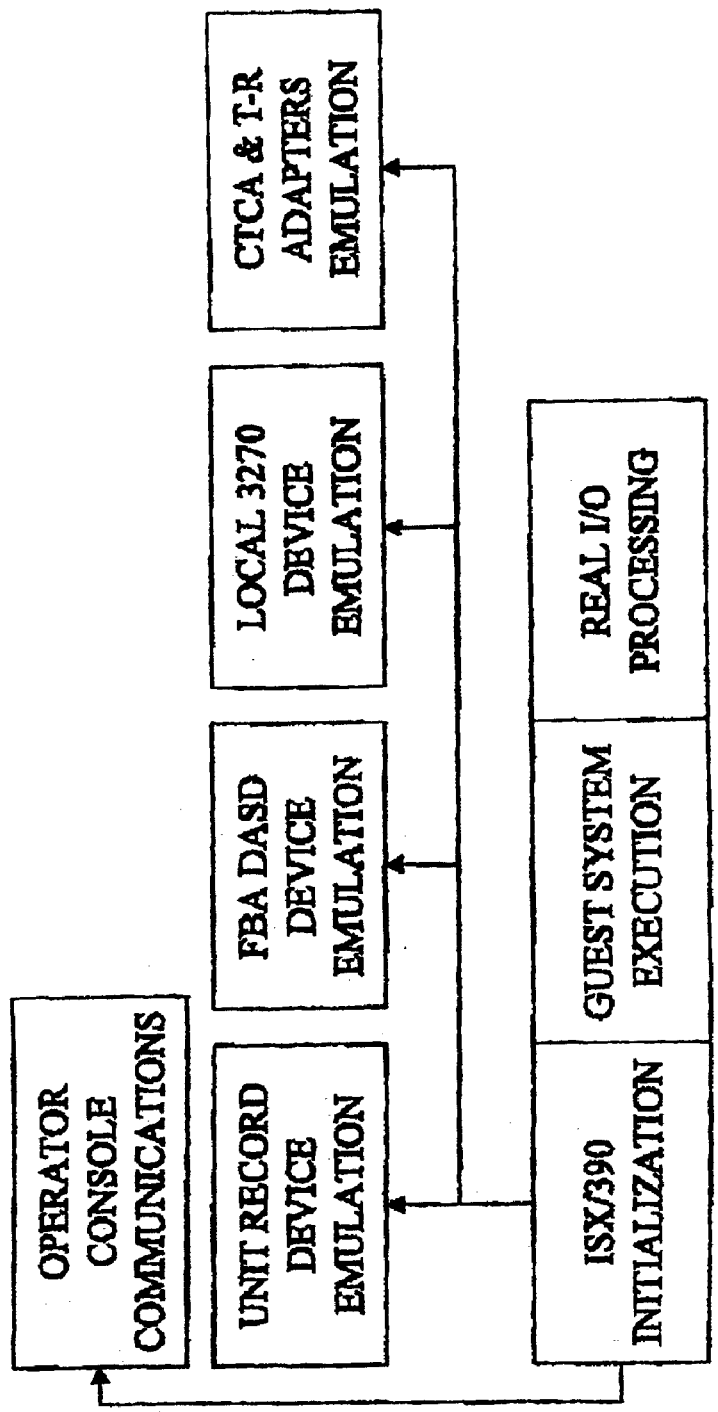
FIG. 1 is a block diagram illustrating the general structure of ISX/390.

FIG. 1.1 is a diagram illustrating the process of fast migration to OS/390.

FIG. 1.2 is a block diagram illustrating dynamic resource allocation upon consolidation of various operating systems on OS/390.

FIG. 1.3 is a block diagram illustrating a consolidation process.

Figures 1, 2, 3:
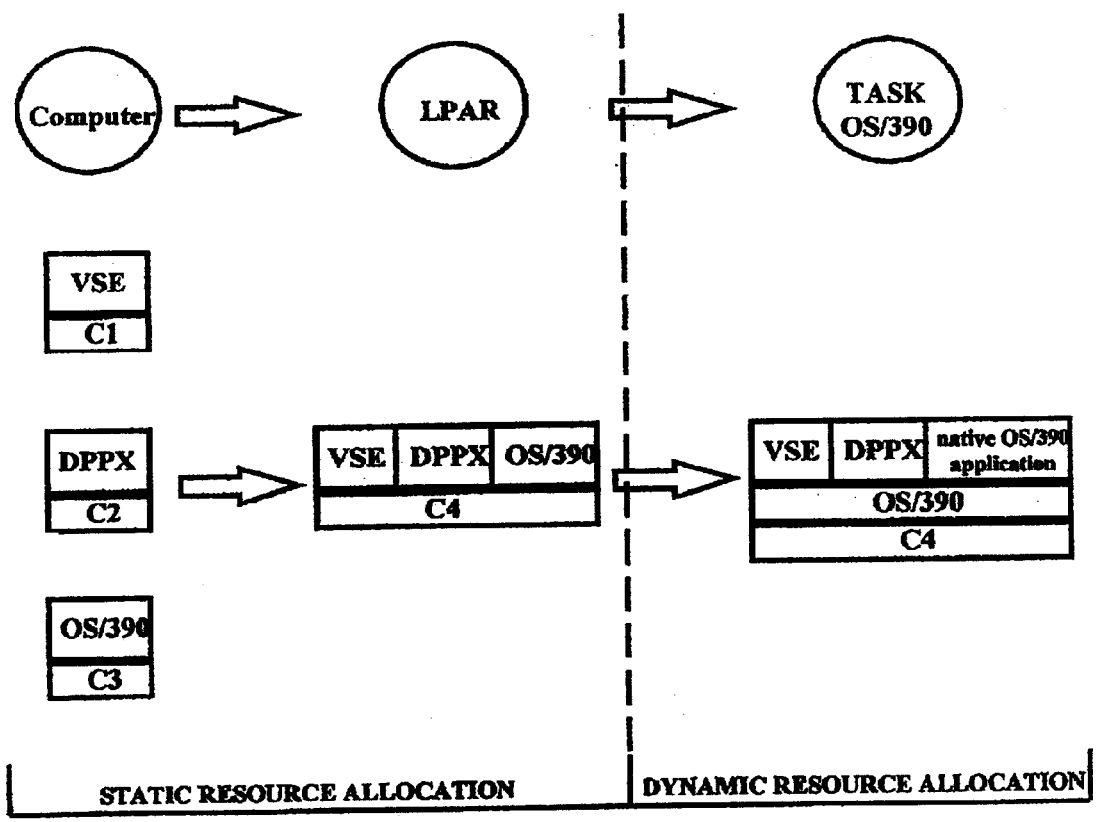
FIG. 2 is a block diagram illustrating the three parts of the main ISX process.
FIG. 3 is a block diagram illustrating the real I/O guest execution process.
Figure 2:
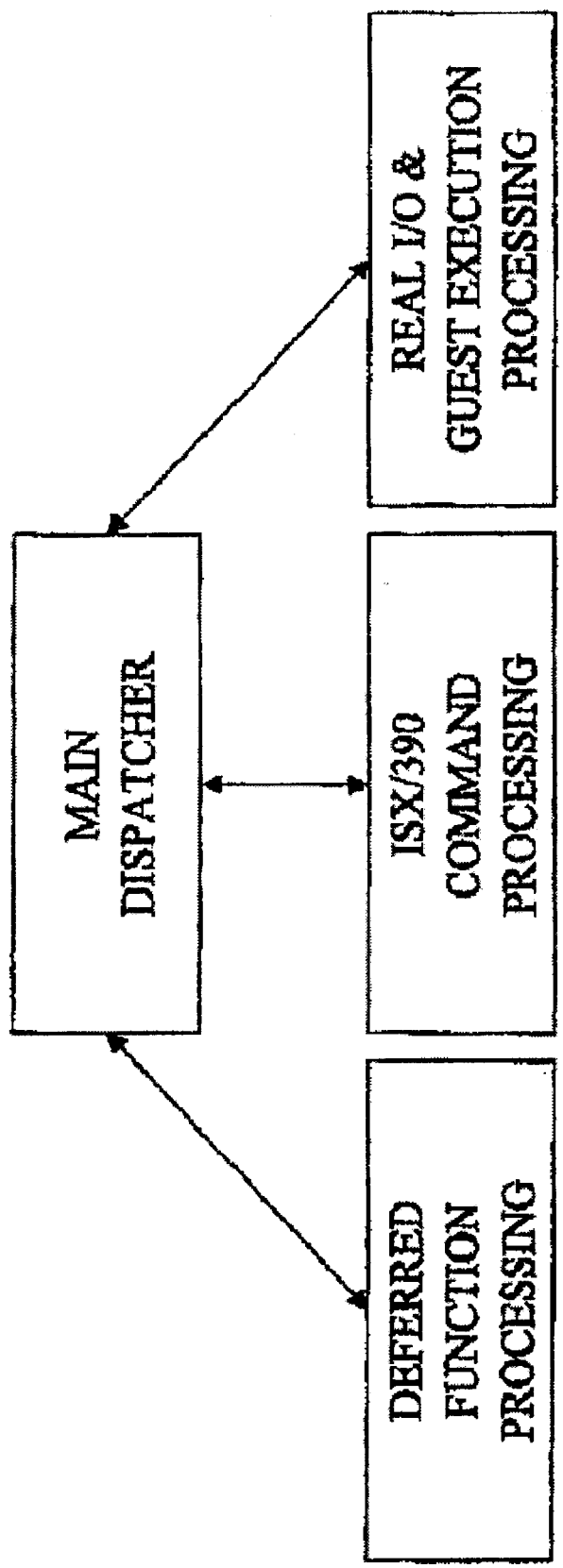
Figure 3:
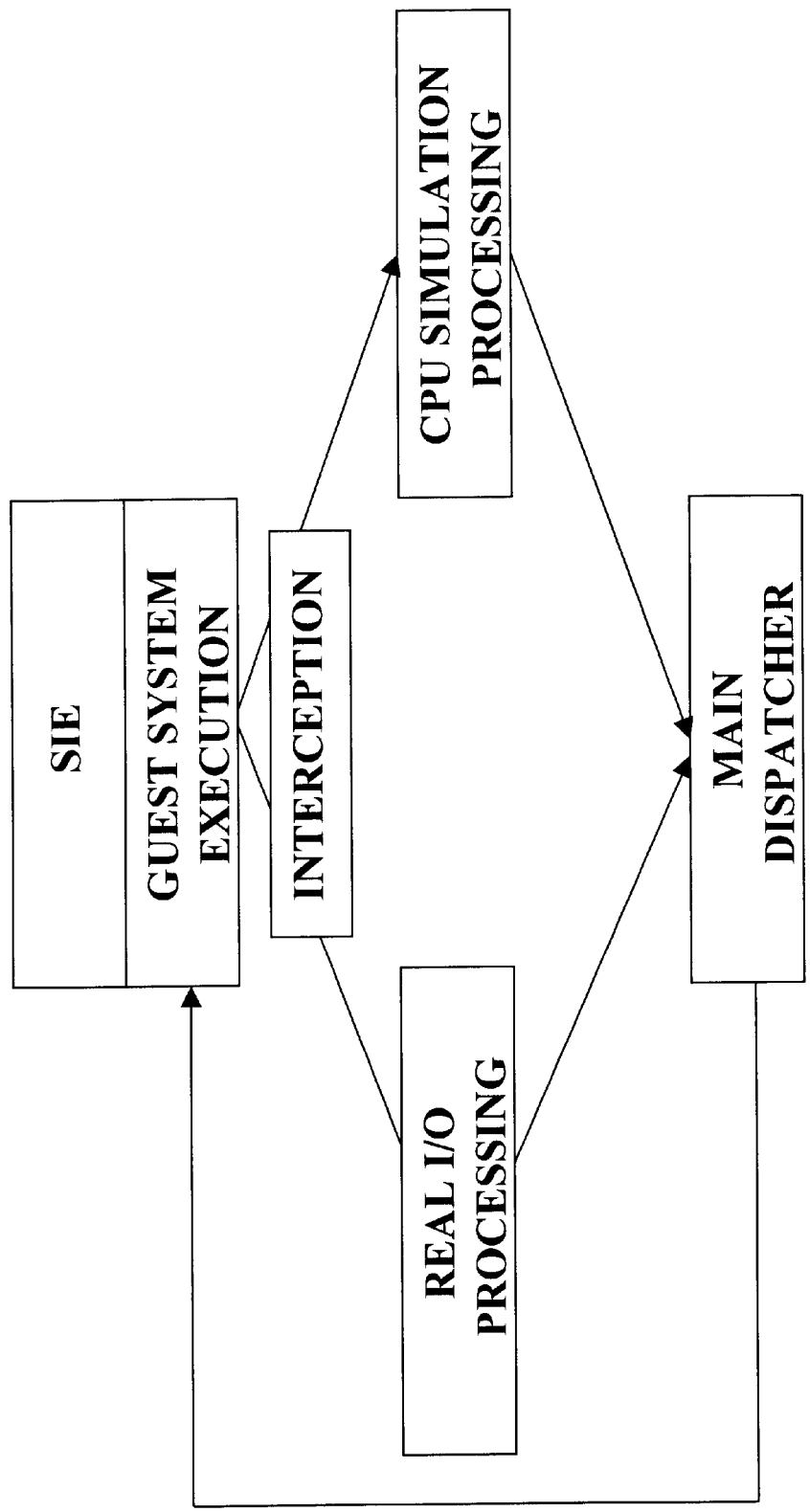
Figures 1, 3:
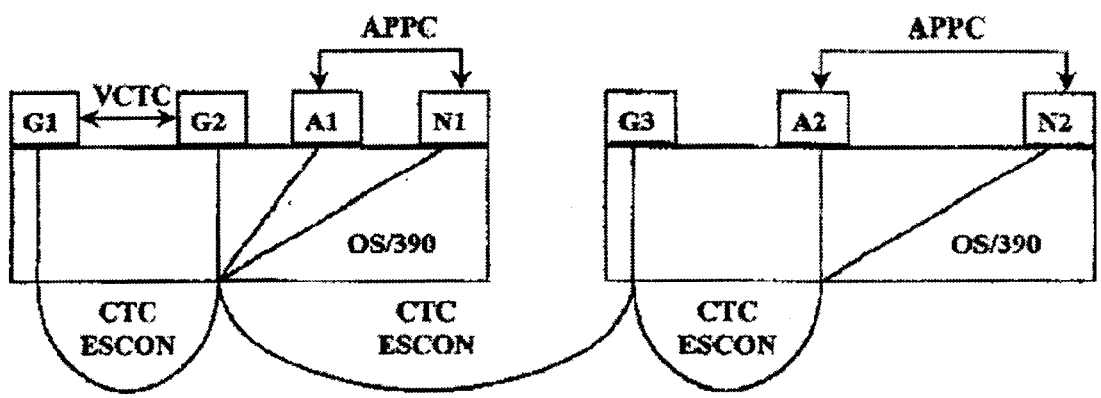
Figure 3:
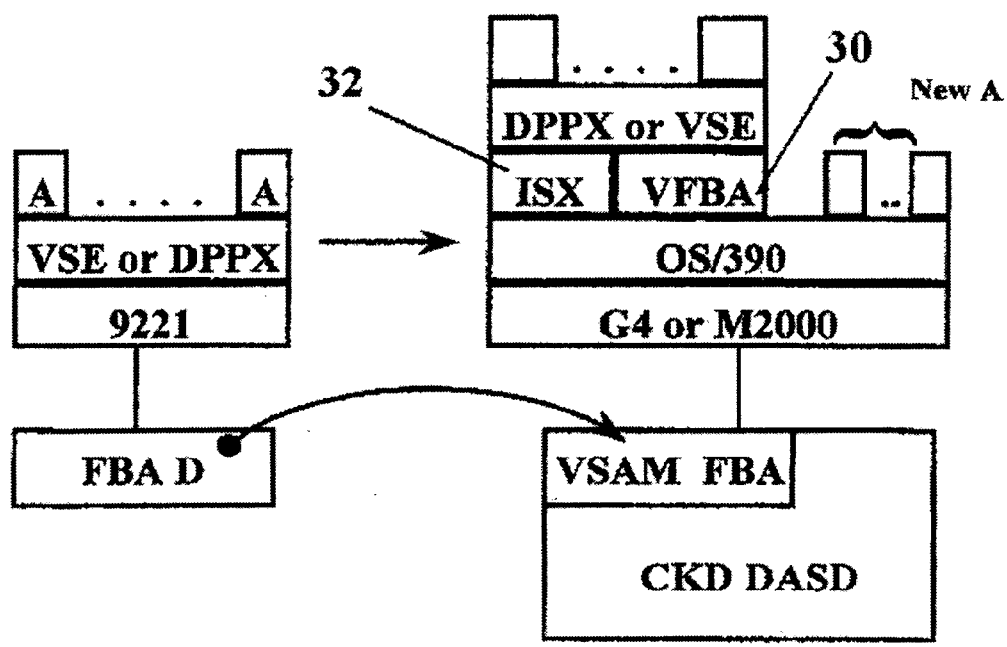
Figure 2:
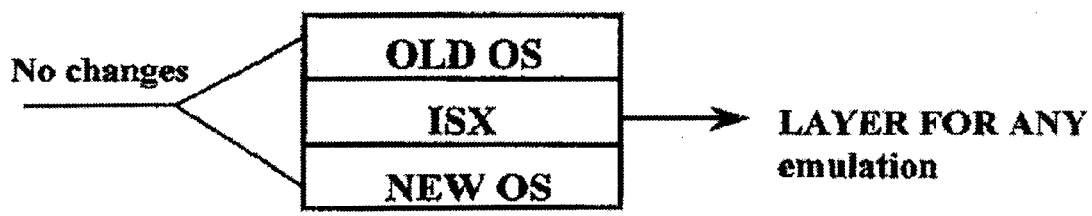

FIG. 2.1 is a block diagram illustrating the structure of the ISX.

FIG. 3.1 is a block diagram illustrating communication between a host and guest applications.

FIG. 3.2 is a block diagram illustrating execution of operating systems and applications.

Figure 4:
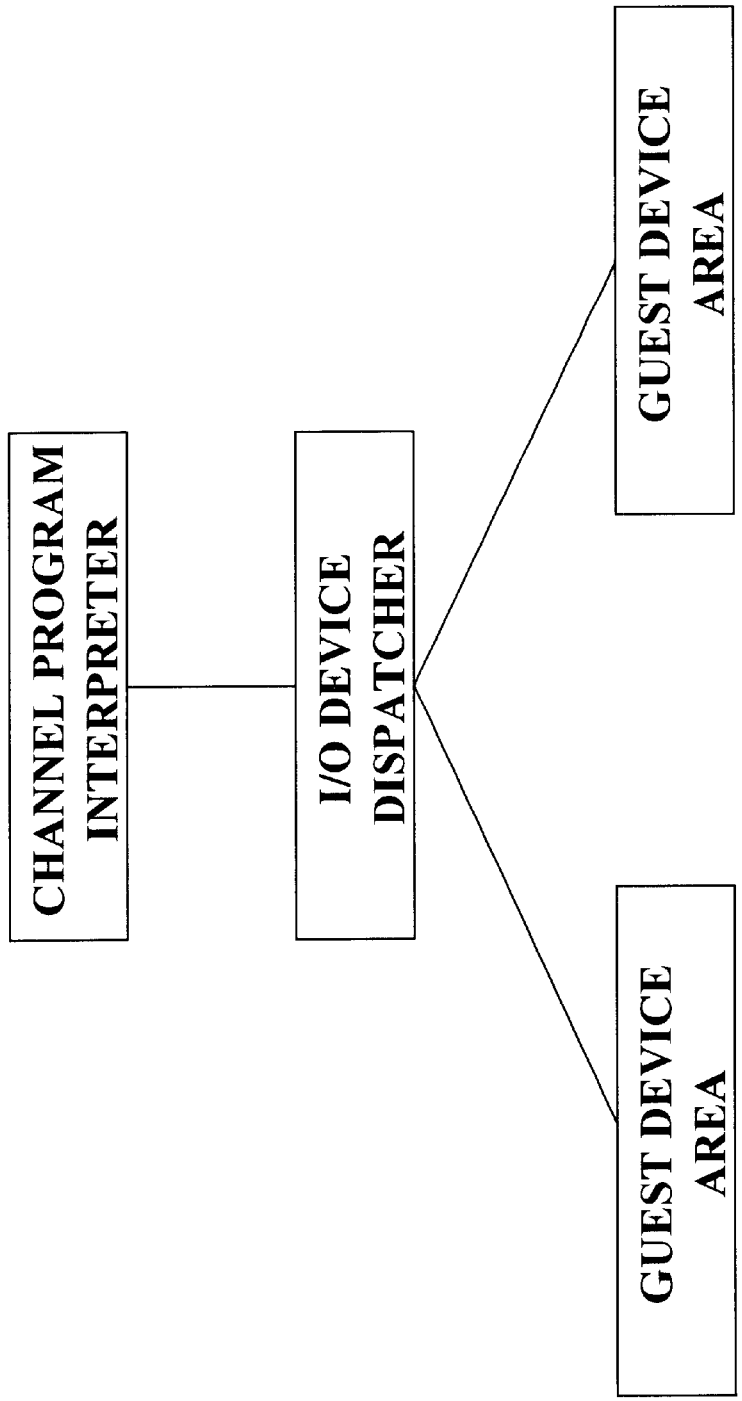
FIG. 4 is a block diagram illustrating the general structure of device emulation.
Figures 1, 4:
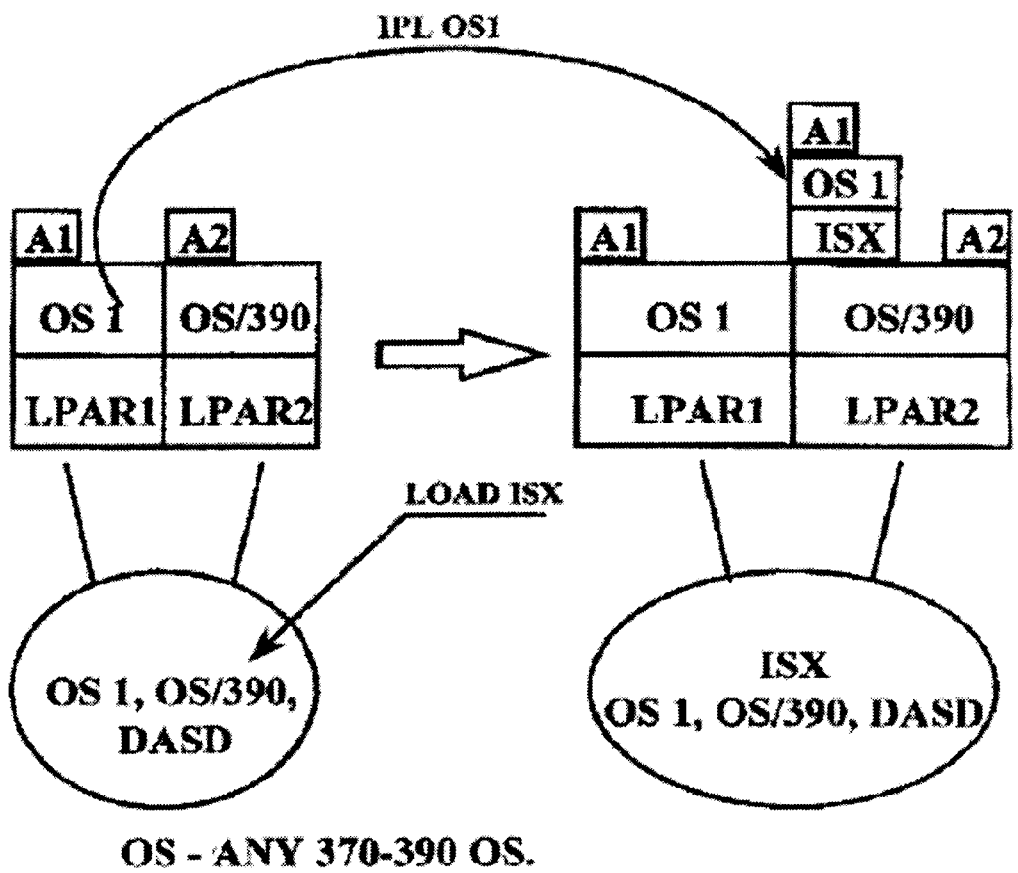

FIG. 4.1 is a block diagram illustrating the process if fast migration to OS/390.

Figures 1, 5:
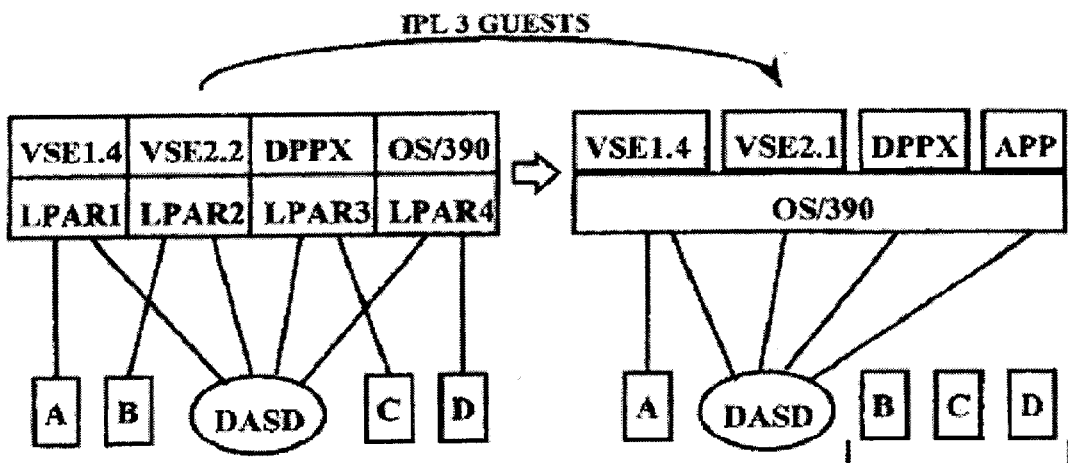

FIG. 5.1 is a block diagram illustrating the process of switching from static to dynamic resource allocation.

Figures 1, 6:
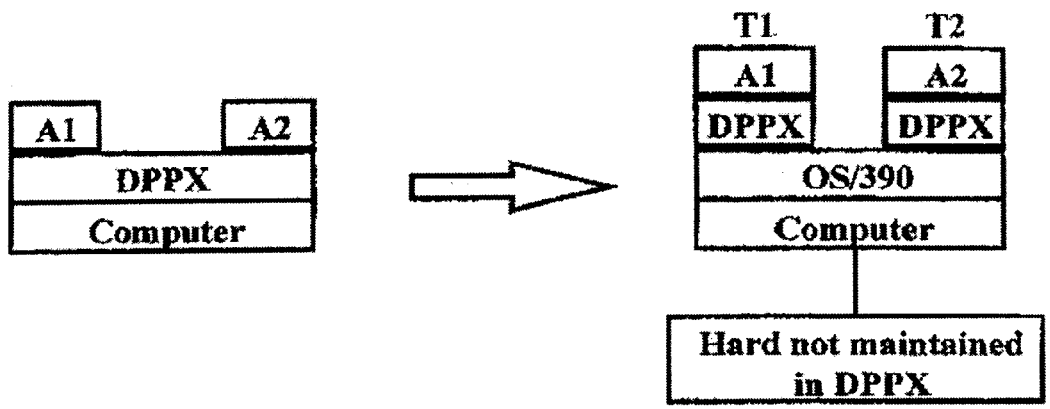

FIG. 6.1 is a block diagram illustrating the process of overcoming restrictions of an old operating system.

Figures 1, 7:
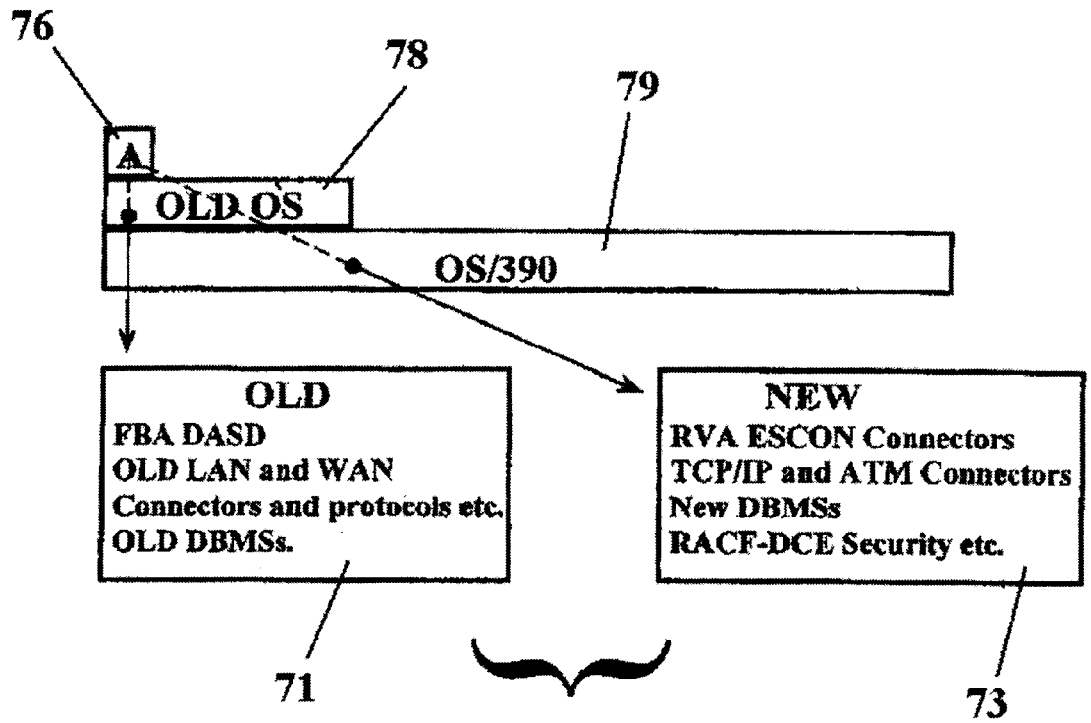

FIG. 7.1 is a block diagram illustrating a joint system environment.

Figures 1, 8:
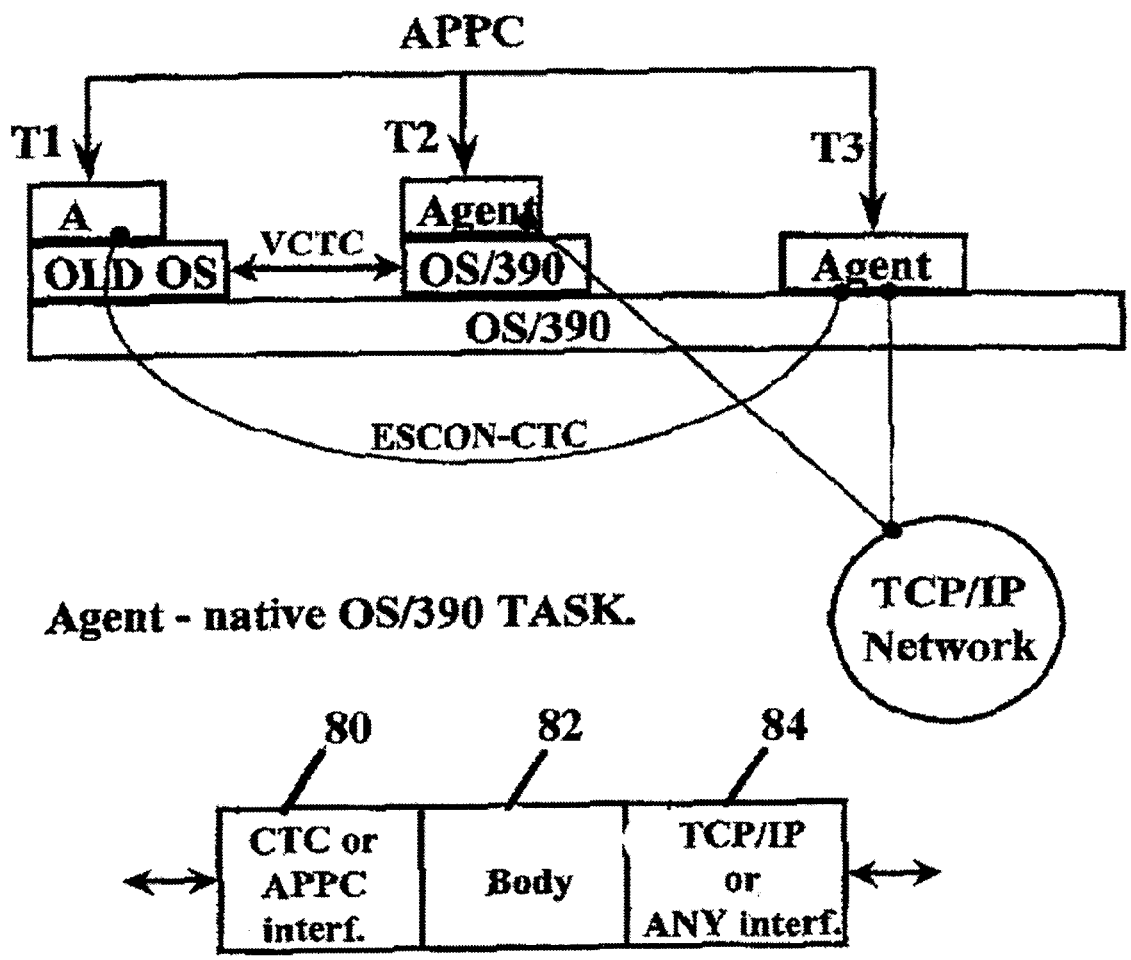

FIG. 8.1 is a block diagram illustrating a TCP/IP connection to an old application.

FIG. 9.1 is a block diagram illustrating data base coexistence.

Figures 1, 10:
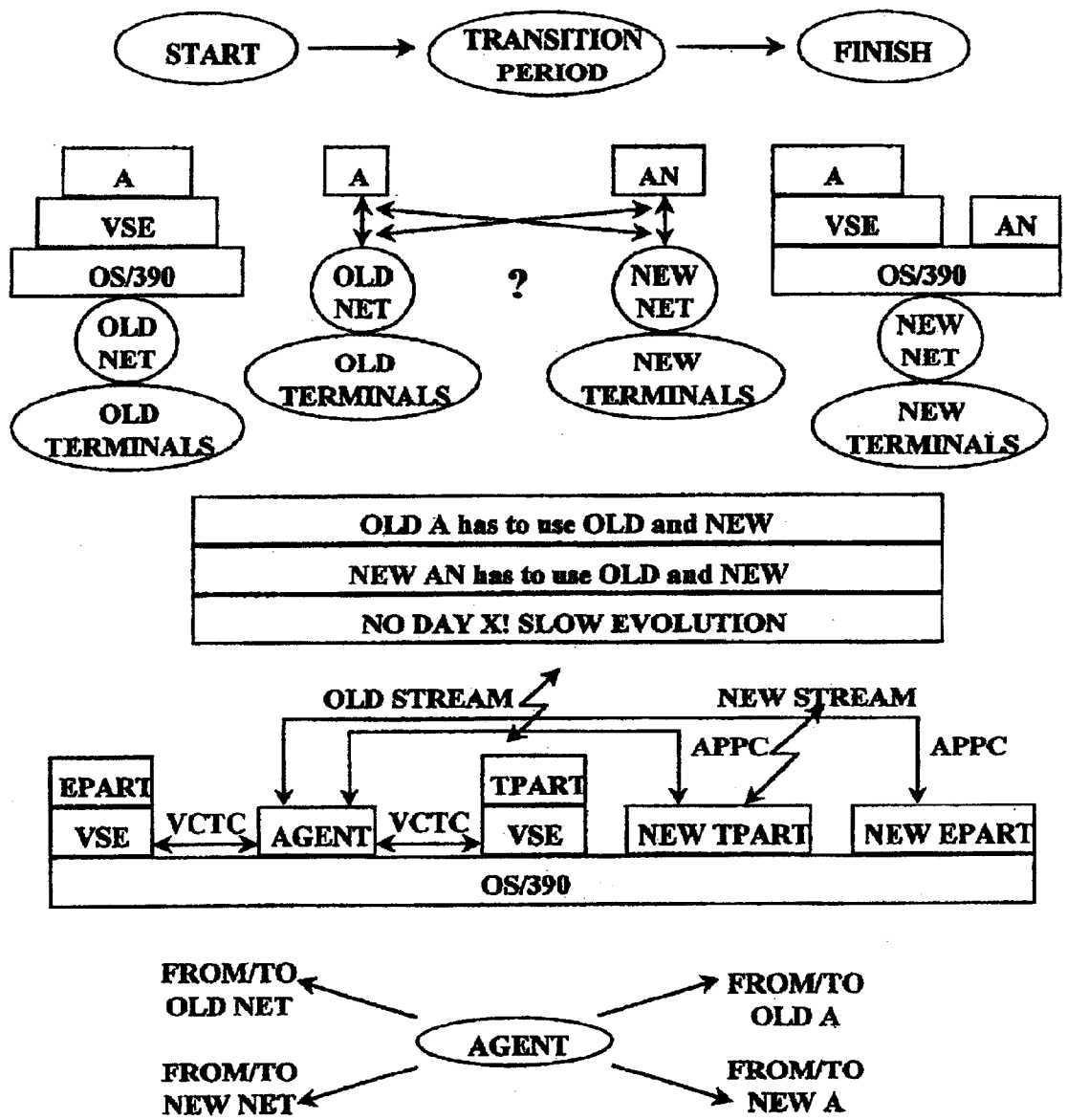

FIG. 10.1 is a block diagram illustrating network coexistence.

Figures 1, 11:
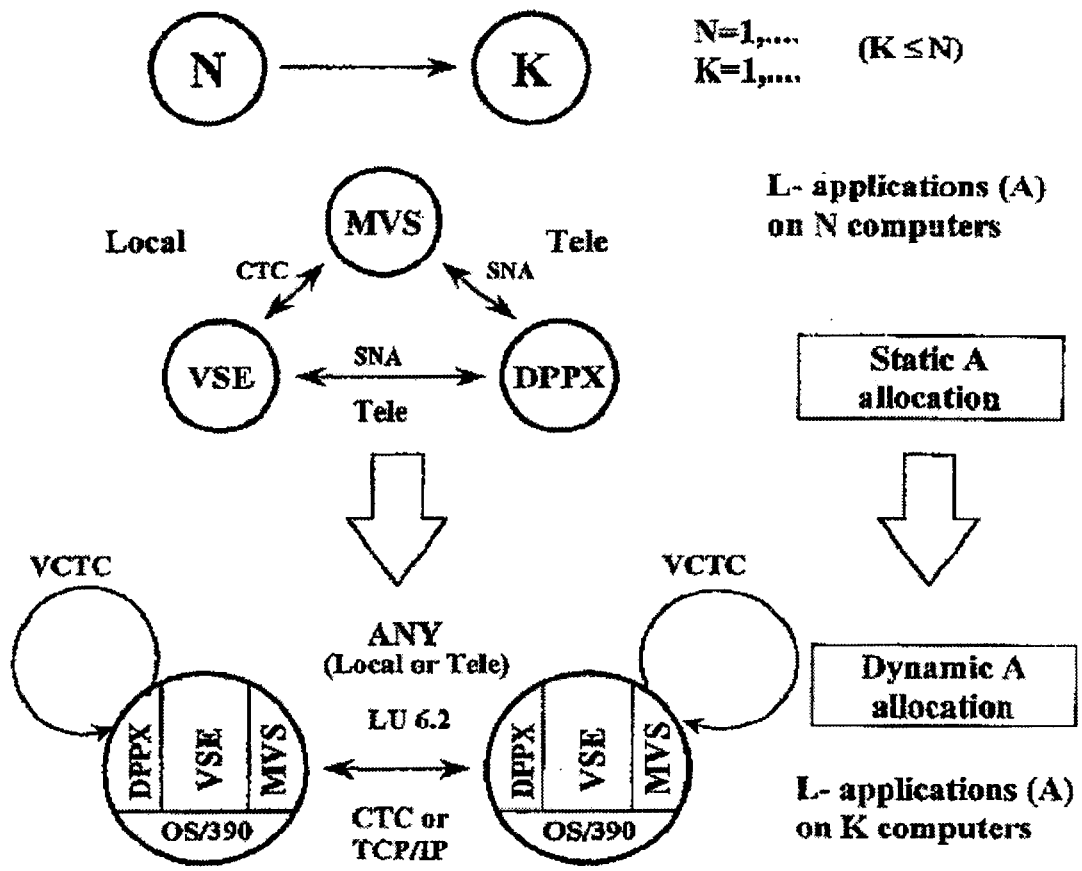
Figure 11:
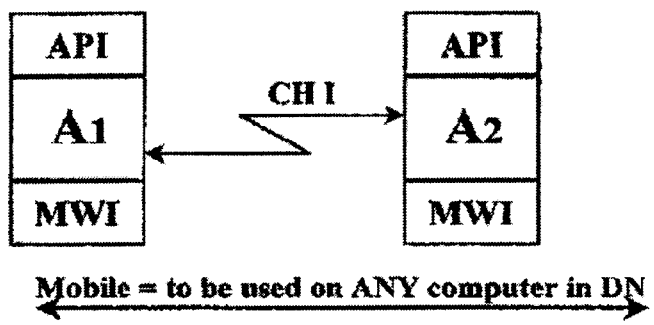
Figure 2:
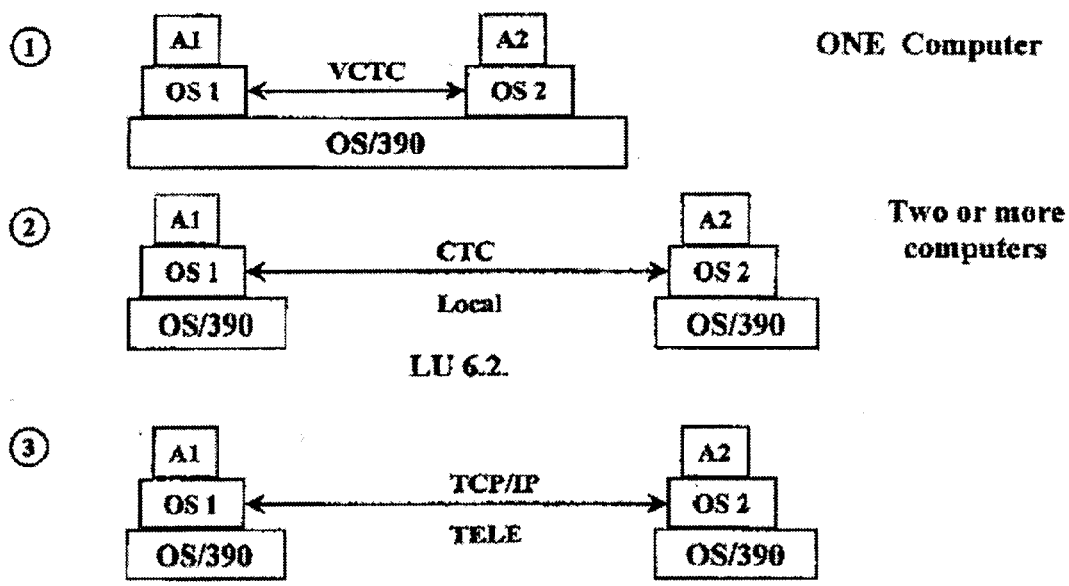

FIG. 11.1 is a block diagram illustrating a multi-machine system migration to dynamic networking.

FIG. 11.2 is a block diagram illustrating a mobile S/390 guest application.

Figure 12:
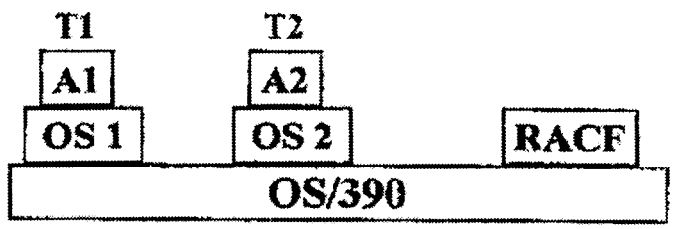
Figure 1:
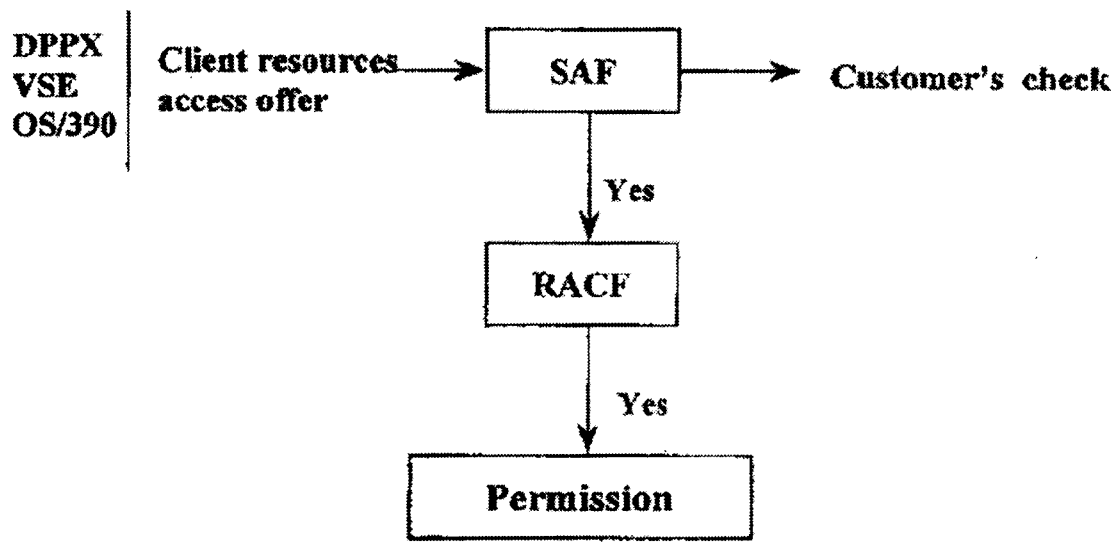

FIG. 12.1 is a block diagram illustrating OS/390 common security for old and new applications (RACF).

Figures 1, 13:
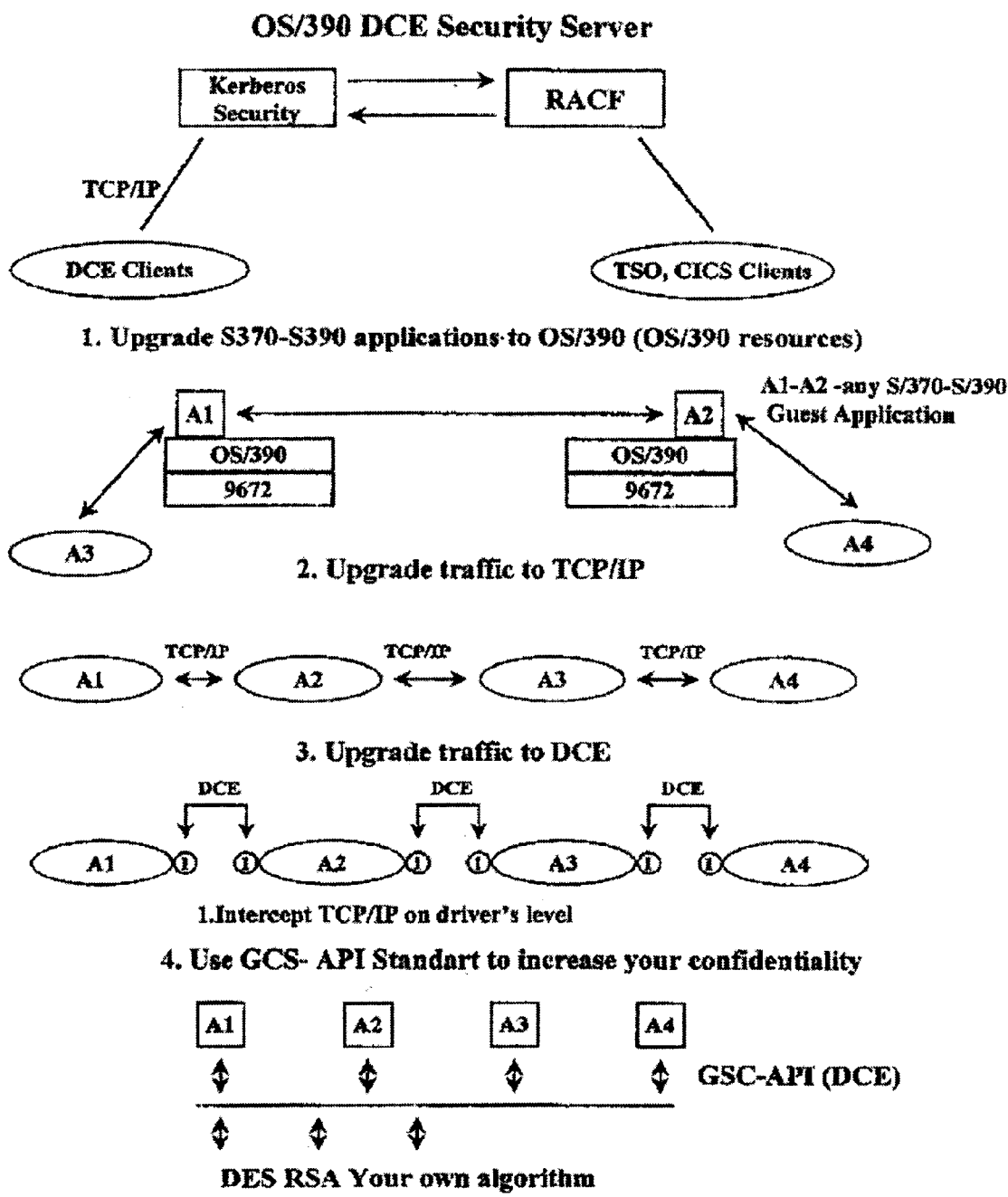

FIG. 13.1 is a block diagram illustrating DCE common security for old and new applications.

Figures 1, 14:
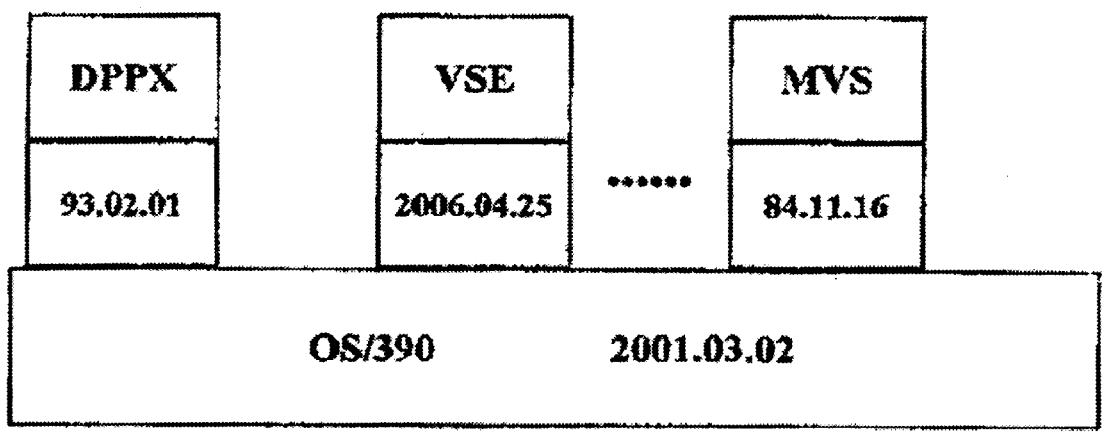

FIG. 14.1 is a block diagram illustrating creation of static and dynamic windows.

Figures 1, 15:
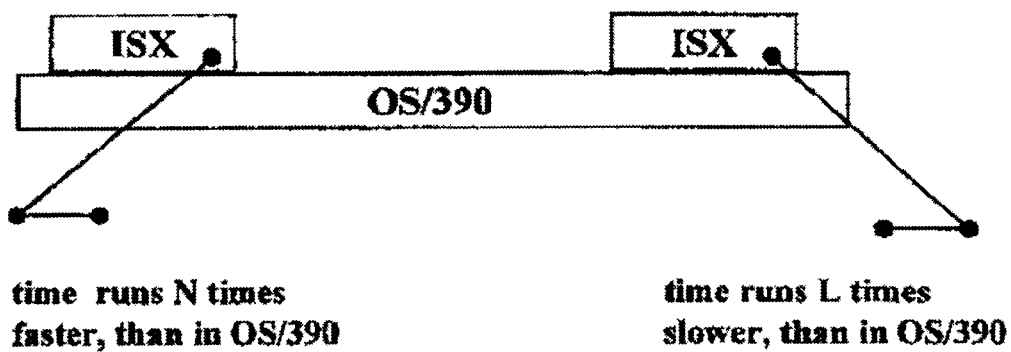

FIG. 15.1 is a block diagram illustrating virtual time structure.

Figures 1, 16:
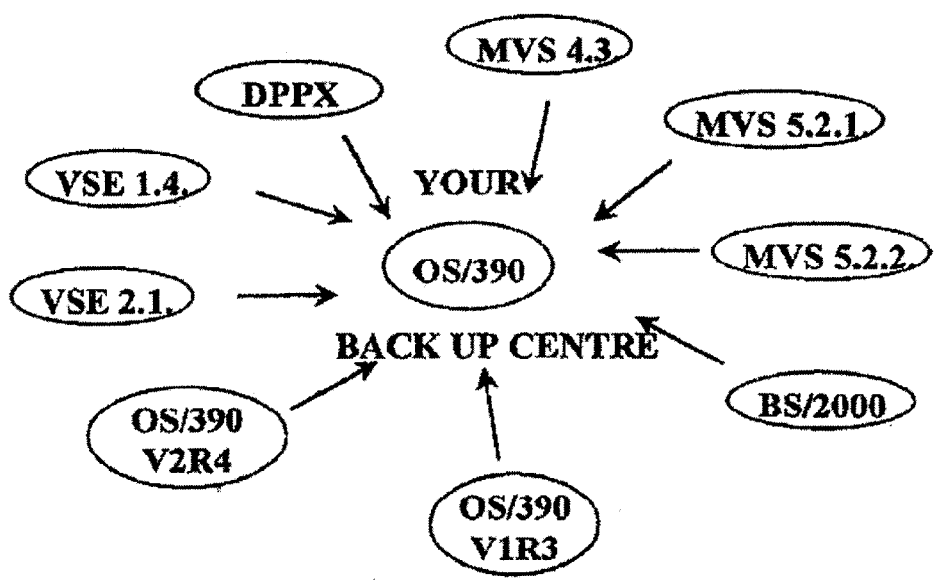
Figures 2, 16:
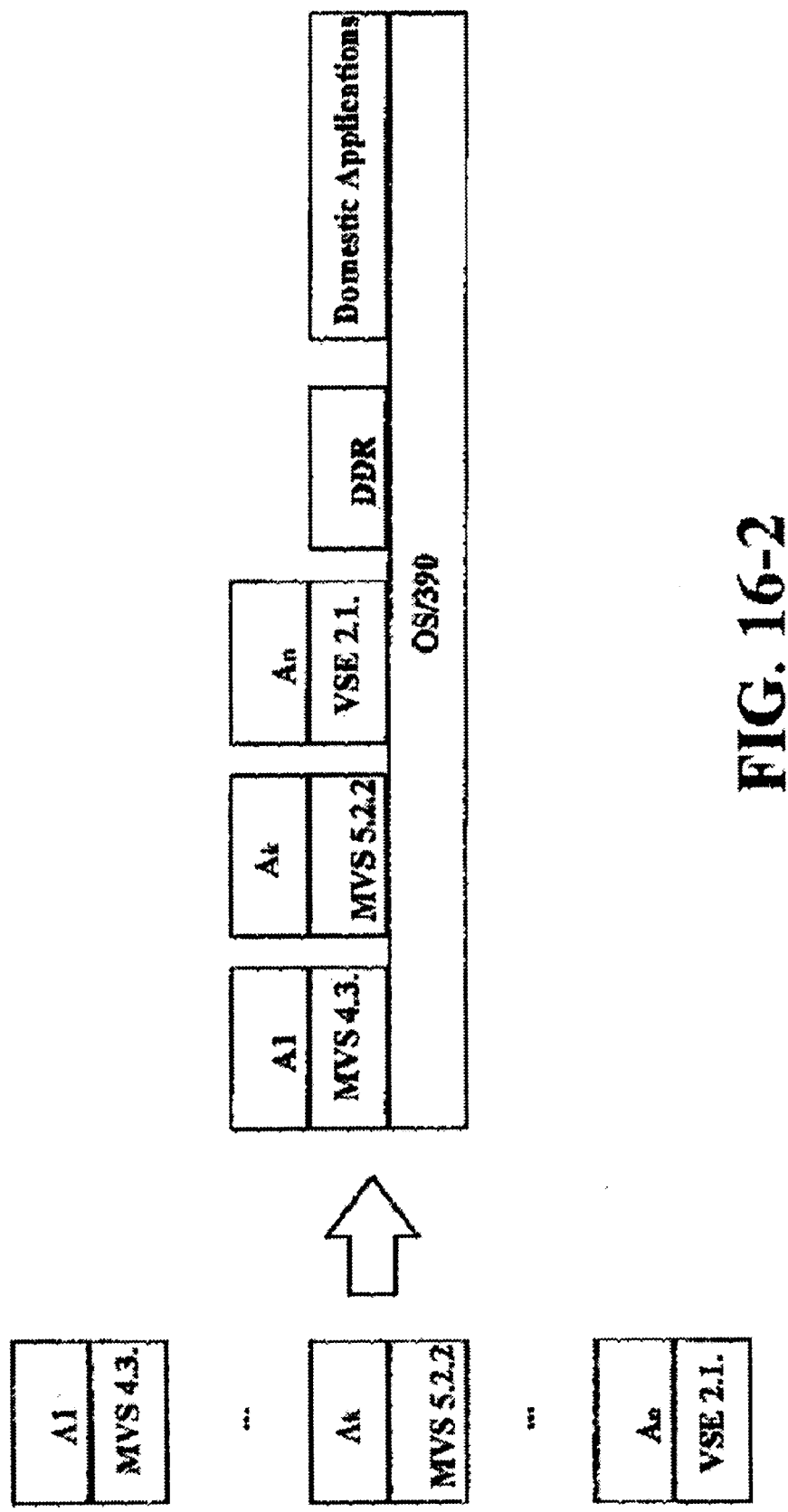

FIG. 16.1 is a block diagram illustrating S/390 back up operation.

FIG. 16.2 is a block diagram illustrating the configuration of back up centers.

FIG. 17 is a table illustrating the ISX family of system products.

DETAILED DESCRIPTION OF THE PREFERRED EMBODIMENT

From the point of view of the host operating system (such as OS/390), ISX is a user's application program that is running under control of the host operating system as a usual user's work process.

During initialization ISX creates a number of subprocesses for execution of its functions using standard facilities of the host operating system (FIG. 1.1). The highest priority subprocess is designed to perform ISX communications with the ISX operator via the console facility of the host operating system.

Lower priority subprocesses are created to perform emulation of different types of I/O devices. The lowest-priority process is the main ISX process used to perform service functions and execution of a guest operating system.

The main process and its subprocesses are executed in parallel to each other or on the multiprogramming base of the host operating system depending on the number of CPUs of the real mainframe.

The main ISX process consists of three parts together with a main Dispatcher that routes control to one or another of the three parts (FIG. 2). The first part of the main ISX process is the Real I/O and Guest Execution Processing. The second part of the main ISX process is ISX Command Execution Processing. The third part is Deferred Function processing. ISX Command Execution Processing is initiated by the Operator Console Communications subprocess when the ISX operator issues and ISX command. The guest execution processing is initiated by a request of ISX Command Execution Processing as the result of ISX operator order to start initial program loading of a guest system. Deferred Function Processing can be initiated by any component of ISX when it is not possible to execute a required function at the moment it is requested.

The most important function of the main ISX process is execution of a guest system and I/O operations requested by the guest system (FIG. 3). Because an operating system cannot run in any operating environment, ISX creates an environment for a guest system that looks like a real machine using the real machine instruction "Start Interpretive Execution" (SIE) from the S/390 architecture and resources received from the host operating system. The instruction is used every time when control has to be passed to a guest operating system. From the point of view of the host operating system, ISX performs a long executed machine instruction, while from the point of view of the guest operating system it is running in a real machine. When an I/O operation or a special CPU function is requested by the guest system the SIE instruction is intercepted and ISX receives control to the point just after the SIE instruction. ISX recognizes the reason for the interception and performs the corresponding function. If an I/O operation is requested with a real I/O device, ISX requests the host operating system to execute it using its standard facilities. If an I/O operation is requested with an emulated I/O device ISX requests the corresponding subprocess to handle the I/O operation. If CPU simulation is necessary to perform the corresponding handler it is entered directly. When initiated I/O operations have been completed, the corresponding I/O interrupts are reflected to the guest system.

There are the following subprocesses to emulate I/O devices for the guest system (FIG. 4):

unit record device (card reader, card punch, printer, printer keyboard) emulation subprocess;

fixed block architecture direct access storage device emulation subprocess;

locally connected display unit emulation subprocess; and channel-to-channel or token ring adaptor emulation process.

Every emulated guest device and its state is described by the corresponding device description block and every emulated device type has its own interpreter of I/O operations. The I/O Device Dispatcher performs a routing function to emulate a number of devices in the same subprocess.

FIG. 1 represents a block diagram, illustrating various operating systems, which can be executed together with their applications in OS/390 as OS/390 tasks. The structure of the interpretive space 10 (ISX) comprises three layers, as illustrated in FIG. 2.1(a). Layer 1 is a user interface of the host operating system. Layer 3 represents a virtual machine, implementing 370 or 390 principles of operation. Layer 2 represents an execute core of the present invention. FIG. 2.1(b) shows that the present invention (layer 10) is started up as a user task of the host operating system. After the start up, the initial program load (IPL) 12 of the guest system is loaded in top of layer 10. The resulting structure, presented in FIG. 2.1(b), comprises user interface on a host operating system 14, and a user task 16 for the host operating system 14, user task 16 comprising applications 18 on top of guest operating system 12 and interpretive space 10. It is understood that as many user tasks 16 can be initiated by the host system 14 as can be handled by the host system. Guest operating system 12 denotes different operating systems executed as tasks on the host system 14.

FIG. 3.1 shows the possibilities of using virtual and real channel-to-channel adapters (VCTC and CTC) as mechanisms enabling communication between guest and host applications. Communication between guest applications G1 and G2, running in the same host operating system, is provided in a standard manner through the physical CTC (the ESCON channel) or through an interpretive space system facility—virtual CTC (VCTC), wherein the latter is provided without activating the I/O operations.

As illustrated in FIG. 3.1, communication between guest applications placed in different host operating systems, such as G2 and G3, or between native applications N1 and N2 of the host operating system is accomplished through standard CTC upon ESCON base. Additionally, native tasks of the host operating system, called agents (such as A1 and A2), were developed to allow communication between guest and host tasks. On the one hand, agents have access to OS/390 standard communication facilities, such as TSO, VTAM, TCP/IP. On the other hand, agents are connected to a guest applications (G1, G2, or G3) through CTC providing a guest application with access to the OS/390 facilities. Therefore, an application of any guest operating system is provided with the OS/390 networking facilities.

The present invention contemplates at least two ways to implement virtual interaction of different types of guest systems in interpretive space (address space to address space): virtual TRN (VTRN) and virtual Channel-to-Channel Adapter (VCTC).

The VTRN product is a virtual implementation of the following physical situation: exit from DPPX or VSE via ICA TRN to physical TRN and entrance from physical TRN via one or several ICA (Integrated Communication Adapter) TRN to one or more DPPXs or VSEs. Since ICA TRN is supported in both DPPX and VSE, any number of guest systems of this type are able to communicate via virtual network without exit to physical network.

The VCTC product is a virtual implementation of the physical connection between operating systems via a CTC adapter. Since CTC is supported in both VSE and OS/390, any number of OS/390 guests and/or VSE can communicate with each other via the virtual network of CTC adapters without exit to the physical network.

The present invention also provides for a virtual network architecture for three kinds of guest operating systems:

DPPX, VSE, and OS/390. DPPX guest systems communicate between themselves and with VSE via virtual TRN. VSE guest systems communicate with DPPX systems via virtual TRN, and with OS/390—via virtual CTC. VSE systems communicate between themselves via both the virtual TRN and virtual CTC. OS/390 systems communicate between themselves via the virtual CTC. Such virtual communication capabilities enable communication between networks of different operating systems without exiting to the physical network.

FIG. 3.2 is a structural diagram illustrating execution of operating systems and applications dependent on FBA-DASD, such as DPPX and VSE, by using FBA emulation in VSAM files stored on CKD DASD. Such execution is accomplished by placing an FBA emulation product (VFBA) 30 in the interpretive space 32, which placement does not require changes either in the guest or in the host operating systems. In addition, as shown in FIG. 3.2, OS/390 has no access to VSE and DPPX files stored directly on FBA, but it can access and operate VSAM files, therefore allowing for sharing different operating systems. As a result, the VSE and DPPX files can be protected by OS/390 RACF (Resource Access Control Facility).

FIG. 4.1 represents the procedure of the fast migration to OS/390. As an example, FIG. 4.1 illustrates transition from OS 1 to OS/390. During the transient period of time, it is intended to run both operating systems: the old OS1 and the new OS/390. Fast migration of the old operating system with its applications could be performed within several hours, providing the guest applications with OS/390 system facilities.

The transition procedure comprises four steps, which do not involve any physical configuration changes of the hardware:

1. ISX is stored in the user library on disks;
2. ISX is started as an OS/390 user task;
3. OS1 is initially loaded in ISX (Initial Program Load IPL) by ISX facilities,
4. Application A1 is started up in the guest operating system OS 1 parallel to A2 in LPAR 1.

Taking into consideration the fact that training in ISX takes 2–3 hours, the system and method of the present invention allows to any application as an OS/390 guest application within one calendar day. Technical personnel can continue to use the programming language of the old operating system and does not have to know in0depth knowledge of OS/390.

FIG. 5.1 illustrates transition from static resource allocation in an LPAR machine to dynamic resource allocation in OS/390. As shown in FIG. 5.1(a), each of the formed LPARs (LPAR1–LPAR4) is supported by hardware (network equipment, terminals, printers A, B, C, D), as well as by connection to DASD. However, it is possible to improve the processing parameters on the same computer equipment by changing the logical processor configuration and using OS/390 virtual facilities without physical system changes. As can be seen in FIG. 5.1(b), the processor is loaded with only OS/390, wherein the other three operating systems (VSE 1.4, VSE 2.1, DPPX) together with their applications APP represent the IPL of OS/390 and are executed as OS/390 guests.

Comparing system configurations illustrated in FIGS. 5.1(a) and 5.1(b), it is shown that in the 5.1(b) configuration the resources of the processor, main storage unit, logical data channels from the processor to DASD are allocated dynamically. In other words, the resources are not statically pre-assigned to one of the operating systems before execution, but are allocated as required by various OS/390 tasks. Consequently, the throughput of the 5.1(b) system configuration increases due to a better use of the available computing resources, compared to that of the 5.1(a) system configuration. Moreover, in the 5.1(b) configuration each of the guest operating systems has four logical channels to DASD instead of only one logical channel, as shown in FIG. 5.1(a). The reliability of the system configuration, illustrated in FIG. 5.1(b), is higher than that in FIG. 5.1(a), because an operating system can communicate with DASD via OS/390 using any one of four logical channels. In the system shown in FIG. 5.1(a), each operating system communicates with DASD via only one dedicated channel.

As also follows from FIG. 5.1(b), since peripheral device A (or B, C, D) is equally accessible for any guest operating system, the number of peripheral devices and channel cards for both the processor and the external devices is reduced. Such reduction leads to lower total configuration costs and to the possibility of using devices B, C, D as a back up. Therefore, the advantages of dynamic resources allocation based on using the OS/390 virtual facilities are the following:

better throughput, improved reliability, reduction of necessary hardware equipment, reduction of system complexity.

It is illustrative to describe what disadvantages and restriction of old non-OS/390 operating systems can be overcome by using the present invention. For example, an old operating system is often restricted to using old peripheral devices (any device through ESCON for the 370 mode, CKD (Count Key Data) disks for DPPX, tape libraries for VSE). It usually lacks access to new OS/390 system facilities (access to RACF or to the most recent protocols) and internal operating system resources.

FIG. 6.1 shows that when an old operating system, such as DPPX, runs as an OS/390 guest task by using the interpretive space of the present invention, many of the above-enumerated restrictions are eliminated. The 370 operating system together with its applications can be run on a 9672 G4 computer, which has no 370 mode and uses devices connected through ESCON. Any old application (A1, A2 in FIG. 6.1), running as an OS/390 task through the interpretive space ISX, uses the resources of the old operating system (DPPX) in monopoly, but at the same time it utilizes hardware and software resources, facilities and protocols of OS/390, and also gets some virtual time from OS/390 and other guest tasks to build timing windows or to test Year 2000 compliance.

Most problems with transition from an old operating system to a new one are associated with the old system's dependence on a particular kind of equipment, API (Application Programming Interface), middleware and network architecture. Such problems are successfully solved by executing old operating systems and applications as guests in the OS/390 system by means of the interpretive space of the present invention, as can be seen in FIG. 7.1. The solution is based on creating a joint system environment 70. In such environment, application A (76), designed for an old operating system 78, for example, DPPX, continues to use the system resources 71 operating in the old operating system. At the same time, application 76, running as a guest task in the OS/390 environment through the interpretive space of the present invention, has access to the resources 73 supported by the new operating system OS/390 (79 in FIG. 7.1). Joint environment can be used to provide coexistence of the old and new Data Base Management Systems (DBMS), or coexistence of the new and old networks during the period of transition between the new and old operating systems.

For example, as shown in FIG. 7.1, if DPPX (old OS 78)/ISX/OS/390 is run on a 9221 machine, the old FBA disks in 71 (not supported in OS/390) and the new RVA ESCON Connectors in 73 (not supported in DPPX) will be equally accessible by guest application 76, running on guest DPPX OS 78.

Applications running in the old operating systems, such as VSE/SP, DPPX, VSE/ESA etc., do not have connection to a TCP/IP network available in OC/390. When the interpretive space of the present invention makes it possible to execute an application and its old operating system as guests in OS/390, the application gains access to TCP/IP networks, as illustrated in FIG. 8.1. Such connection is accomplished via use of agents—OS/390's own tasks comprising three layers. Layer 80 is an application interface, layer 82 is an agent's body, layer 84 can be a TCP/IP interface or an interface to another OS/390 resource. The application interface can be realized either through virtual or real CTC, or through APPC (Advanced Pear-to-Pear Channel), depending on the availability of these resources in the guest operating system, or by using any other task-task access resources supported by both host and guest operating systems. If an old operating system is DPPX, it is connected to TCP/IP resources the following way:

Similarly, an agent (through layer 84) can serve as a connector to other OS/390 system resources, such as CICS, DB2 and others.

In order to give DPPX guest system access to TCP/IP networks, the guest DPPX in APPN mode is connected on TRN via VICATR and one OSA-2 port, and via other TRN OSA-2 (Open System Adapter) port comes back to OS/390 VTAM. Then OS/390 communicates with the terminals connected to TCP/IP via TELNET. For example, HCF (Host Communication Facility) is in OS/390 VTAM (Virtual Telecommunication Access Method), its display is on TELNET, terminal—on TCP/IP, and DHCF (DPPX Host Communication Facility)—in DPPX. Such a switch over to a TCP/IP network is also possible for a guest DPPX group creating a virtual APPN (Advanced Pear-to-Pear Network) on a virtual TRN. In this case all of them will output on OS/390 VTAM (Virtual Telecommunication Access Method) via DPPX, connected to OSA-2. Moreover, any TCP/IP network terminal TN3270 (TELNET) can be activated as a local non-SNA (System Network Architecture) DPPX terminal—product LRTE (Local Remote Terminal Emulation).

During the transition period from an old operating system to a new one, it is often necessary to provide for coexistence of the old and new data bases management systems (DBMS). The guest execution of the old DBMS in OS/390 is shown in FIG. 9.1. The stream of data flowing to the old DBMS is split into two data streams: one data stream directed to the old DBSM, the other one—to the new DBMS. The idea under splitting the data stream into two streams is to synchronize the data bases during the transient period, ensuring that the newly developed OS/390 applications and the old applications work with the same data. Splitting the data stream into two data streams is accomplished by creating two special areas in the old operating system (VSE in FIG. 9.1). One special area is an executive part EPART, the other one is a telecommunication part TPART, as illustrated in FIG. 9.1. The exchange between TPART and EPART is carried out at the agent level in the operating system. The data flow is divided into the new and old DBMS with realization of any function, such as, for example, comparison of acknowledgements received from the old and new DBMS before the transmission of the acknowledgements to the network, i.e. automation of the old and new applications joint debugging.

The same parallel execution is implemented not only for DBMS, but also for other old and new operating system resources, for example, for networks, as shown in FIG. 10.1. At the beginning of the transient period application A runs on the old terminals across the old network. At the end of the transient period application A and application AN, the newly developed application for OS/390, both work with new terminals across the network associated with the new operating system. During the transient period both the old and the new applications run on old terminals across the old network and on new terminals across the new network.

The potential problem of synchronizing operation of the old and new terminal systems may arise due to the fact that the new terminals and protocols might not be supported by the old operating system. Similarly, the old terminals and protocols might not by supported by the new operating system. In the present invention the problem is solved by utilizing OS/390 guest facilities, as indicated in FIG. 10.1. The solution is based on the use of an AGENT—a 4-way switch, supporting simultaneous operation of two guest and two native applications. In that Figure, EPART is an executive part of the old application, TPART is a network part of the old application running on the old terminal net, NEW EPART is an executive part of the new application, NEW TPART is a network part of the new application operating on the new terminal net. The exchange between the allocated parts of the old and the new applications is set up by system resources, which are accessible to the guest system in a manner shown in FIG. 10.1.

Migration from a multi-machine system to a system with fewer machines, which utilizes dynamic networking, is illustrated in FIG. 11.1. N is the number of computers existing in the old network. K, which is smaller than N, is the number of computers existing in the new network. If L applications are running on N computers of the old network with static resource allocation, then it is possible that all L applications will not be executed on all N computers due to inevitable differences and diversity of the operating environment. After migration to K computers of higher performance, configured in a manner shown in FIG. 11.1, each application L can be executed on any machine by means of dynamic resource allocation.

The logical structure of RACF (OS/390 common security for old and new applications) interacting with guest applications A1 and A2 is shown in FIG. 12.1. After the process of migration has been finished, guest applications A1 and A2 together with guest operating systems OS1 and OS2 run in the interpretive space of the present invention as OS/390 tasks and, like any OS/390 task, can be controlled by RACF resources. If a tighter security control over access to a OS/390 network is required, the message flow between guest tasks and OS/390 network resources can be directed to an agent task. This agent task is similar to the agent task described with regard to the connection between TCP/IP networks and old applications in FIG. 8.1. If it is necessary to perform individual checking procedures while at the same time controlling access to system resources not protected by RAFC, an additional OS/390 resource SAF (System Authorization Facility, FIG. 12.1) can be used. SAF and RACF interaction procedure is shown in FIG. 12.1.

It may become necessary to integrate independently developed TCP/IP networks (distributed computing systems) and classical centralized systems, implemented according to SNA (including systems running on operating systems without TCP/IP communication resources and, moreover, systems not supporting distributed computer environment (DCE)). Certain elements of system solutions based on ISX, discussed in the foregoing sections, allow to integrate the centralized (OS/390) and distributed (Unix, Windows NT) systems under common security system (DCE security server) in a manner presented in FIG. 13.1. One solution is based on the OS/390 standard construction of the implementation of such integration, shown in FIG. 13.1. As can be seen in FIG. 13.1, the first step is to upgrade OS/390 applications combined and their operating systems to OS/390 guest mode. After the upgrade, the applications become OS/390 resources secured by RACF. The second step is to upgrade the traffic between the applications to the TCP/IP level. Upgrading old applications can be performed in accordance with the approach discussed above with regards to FIG. 8.1. The third step is to upgrade the traffic between the applications to the DCE level. This upgrade is performed by intercepting the application traffic at the TCP/IP driver level and re-directing the traffic to other addresses in the DCE infrastructure. (Various system products of independent vendors can be used to the step three upgrade). Finally, the fourth step, if necessary, is to improve the confidentiality of the system by creating and implementing the system's own (proper, individual) encryption instead of commercially available encryption. This procedure is implemented according to the OPEN GROUP standard GCS-API, as shown in FIG. 13.1.

The interpretive space of the present invention offers possibilities to test if a particular application is Year 2000 compliant. The testing can be done by creating static or dynamic time windows for guest tasks. There are two functions in ISX for operating guest systems: VDAT, VTIME. VDAT inputs a particular date separately into each guest operating system, such as DPPX, for example (FIG. 14.1). A separate input enables parallel testing of either several systems or only one system. VTIME allows to "fast forward" guest DPPX's virtual time to a required date, accelerate the testing and create an algorithm for a long-term forecast of the system's time related behavior.

The implementation of the interpretive space makes it possible to perform back up operations in an OS/390 computer center after various other operating systems have been integrated into a network (FIG. 16.1). Without changing the computer center's operating system configuration, the interpretive space enables execution of the configuration of all backup centers with all their existing setups as guests of OS/390 in a manner shown in FIG. 16.2. The stand-alone programs can also be executed as OS/390 guests, so there will be no need to stop the OS/390 facilities or to use a specific machine, LPAR, or VM.

Preparing for a back-up comprises the following steps:
1. Backing up a migrated operating system, for instance, with a DDR utility.
2. Loading the interpretive space (ISX) utility on the back-up computer center.
3. Restoring the backup operating system by with DDR at the back-up computer center.
4. Starting the ISX as a OS/390 user TASK and utilizing the ISX to perform IPL of the backup operating system on top of ISX.

After that the backup operating system is ready to run backup applications.

ISX/390 Installation
Machine Requirements.

One can install and run ISX/390 in OS/390 system on any IBM S/390 processor that has interpretive execution facility and is supported by OS/390 operating system.

One magnetic tape device (e.g. 34xx tape unit) is used to install ISX/390.

Auxiliary DASD storage space is desired for the following resources:

SYSPRINT, if routed to DASD,

Library space—8 tracks of library space on a DASD device, such as a 3380 type device for a new library.

System Requirements
ISX/390 requires OS/390.
Virtual Storage Requirements
The minimum ISX/390 storage requirements are the following:

256K to run ISX/390, 4K for every I/O device used by a guest system,

OS/390 system usage requirements, the size of the main storage should be known by a guest system.

Installing ISX/390 in OS/390
ISX/390 distribution tape is a standard-labeled 9-track magnetic tape written at 6250 bpi with volume serial number ISX390.

To install ISX/390, the following sequence is executed:

```
//ISXINST    JOB (account),'name',TIME=1440,REGION=1M,
//           CLASS=c,MSGLEVEL=(1,1),MSGCLASS=m,
//           NOTIFY=userid,USER=userid
//ISXSTEP    EXEC PGM=IEBCOPY
//SYSUT1     DD DSNAME=ISX390.LINKLIB,DISP=SHR,
             LABEL=(1,SL),
//           UNIT=TAPE,VOL=SER=ISX390
//SYSUT2     DD DSNAME=ISX.LINKLIB,DISP=(,CATLG),
             UNIT=3380,
//           SPACE=(TRK,(8,1,2)),VOL=SER=xxxxxx,
//           DCB=(RECFM=U,BLKSIZE=32740)
//SYSPRINT   DD SYSOUT=*
```

ISX/390 Customising:
Authorization ISX/390 Libraries

ISX/390 program libraries needs the Authorized Program Facility (APF) authorization. So, one has to specify the ISX.LINKLIB name in parmlib IEAAPFxx list or PROGxx list.

In these lists, there are listed the dsnames of libraries along with the serial numbers of volumes on which the libraries resides. So it will be necessary to code ISX.LINKLIB name and its residence volume serial number.

Furthermore, one will have to code APF=xx in IEASYSxx parmlib list (or OS/390 system operator has to specify APF=xx while IPL) or to code PROG=xx in IEASYSxx parmlib list (or a system operator has to enter the command SET PROG=xx before ISX/390 job is started up).
ISX/390 Startup Job To start up ISX/390 it is necessary to provide a job looks like this:

```
//ISXRUN     JOB (account),'name',TIME=1440,
//           CLASS=c,MSGLEVEL=(1,1),MSGCLASS=m,
//           NOTIFY=userid,USER=userid
//ISXSTEP    EXEC PGM=ISXINI
```

-continued

```
//SYSLIB    DD DSNAME=ISX.LINKLIB,DISP=SHR
//STEPLIB   DD DSNAME=ISX.LINKLIB,DISP=SHR
//SYSPRINT  DD SYSOUT=A
//SYSIN     DD DUMMY
```

The ISXINI name is ISX/390 initialization load module name.

The SYSLIB DD statement is required.

The SYSIN DD statement defines a data set, which contains the ISX/390 operator's commands. The commands can be entered from an input data stream, from a sequential data set, or from ISX/390 operator's console.

ISX/390 EXECUTION CONTROL

Communications with ISX/390

When ISX/390 is started up, its initialisation procedure sets up non-swappable mode of ISX/390 execution, receives ISX/390 job name, current CPU ID, and ASID of its own address space from OS/390, opens its own load module library, fixes a few of its pages in real storage, creates communication subtask and a few additional subtasks used for I/O device emulation, issues the 'SX99I ISX/390 initialisation completed' message and executes operator commands from the input command file.

An OS/390 operator can influence ISX/390 by means of ISX/390 commands. Any OS/390 operator who is working with ISX/390 becomes an operator of ISX/390. As an operator, he or she has to control ISX/390 tuning, resource assignment, and ISX/390 operation.

All ISX/390 messages are sent to the OS/390 system console. ISX/390 commands are entered from the OS/390 system console or from the input command file.

An ISX/390 operator is able to enter an ISX/390 command via the MODIFY command of OS/390:

F ISX_job_name, . . . ISX/390_command. . . .

With the SET command being entered from input command file or from OS/390 console ISX/390, an operator can determine:

whether or not ISX/390 has to issue all messages and responses to ISX/390 operator or only those messages with the 'attention' suffix A or W in its identifiers, the name of the OS/390 console to be used to communicate with ISX/390.

Definition of ISX/390 License Parameters

Before ISX/390 can be used, it is necessary to assign passwords to customers and to set up the license expiration date, so that a guest system can be loaded into an interpretive space for execution.

The SET command is issued to set up the password and the expiration date for ISX/390. It is possible to provide the SET command with these parameters in the Command File of the ISX/390 start up job or to enter the command via the ISX/390 operator console.

Definition of a Guest Environment

Before executing a guest system, an ISX/390 operator defines the size of the interpretive space using the SET command. When the interpretive space has been defined, ISX/390 can execute a guest system.

Additionally, the SET command helps an ISX/390 operator determine the following characteristics of a guest environment:

whether ISX/390 performs an account function, the equivalence of an ISX/390 interpretive space and a VM/ESA virtual machine, whether to execute a guest system in the interpretive space with or without interpretive execution assistance, whether ISX/390 will issue all messages and responses to an ISX/390 operator, or only messages having the 'attention' suffix A or W in their identifiers, the name of the OS/390 console to be used to communicate with ISX/390 and an emulated printer keyboard of a guest system.

It is possible to provide the SET commands with above mentioned parameters in the Command File of the ISX/390 start up job, or to enter these commands via the ISX/390 operator console.

Controlling Real I/O Devices

Usually real I/O devices run with a guest system. Real I/O devices are assigned to a guest system in the ATTACH command of ISX/390. If a real I/O device is used by a guest system, such as I/O device has to be permanently assigned as a guest system in the ATTACH command, specified in the Command File of the ISX/390 start up job. If a real I/O device is not permanently used by the guest system, it may be assigned as the ATTACH command entered from a console by a ISX/390 operator. The assigned device may be removed from a guest system by the DETACH command of ISX/390.

A real I/O device can be assigned to a guest system in the OS/390 environment, if:

an I/O device is in the OS/390 configuration, an I/O device has not already been assigned to another OS/390 address space (for non-DASD devices).

If a real I/O device is not supported in OS/390, that device has to be defined in OS/390 as DUMMY. To assign the device to a guest system, the device class must be specified in the ATTACH command line.

To assign a 'not operational' I/O device to a guest system, it is necessary to request an unconditional attachment in the ATTACH command line.

A few guest systems, running under different ISX/390 in OS/390 environment, can work with the same DASD devices simultaneously. But if a guest system issues reserve/release I/O requests, then that guest system acquires exclusive control over an the corresponding DASD device.

The RESET command allows an ISX/390 operator to reset an active I/O request of a guest system regarding a real I/O device.

The READY command allows an ISX/390 operator to examine and set an operational status of a specified real I/O device.

The ACCOUNT command allows an ISX/390 operator to estimate I/O activities of a guest system related to real I/O devices.

The DISPLAY command allows an ISX/390 operator to display dynamic characteristics of activities of real devices.

Controlling Emulated I/O Devices

Emulated devices such as unit record devices, are specified in order to link guest applications to OS/390 data structures.

Emulated I/O devices for a guest system are defined in the DEFINE command of ISX/390. If an emulated I/O device is permanently used by a guest system, this I/O device is the DEFINE command of the Command File of the ISX/390 start up job. If an emulated I/O device is not permanently used by the guest system, this device may be defined in the DEFINE command entered from a console by an ISX/390 operator. A Defined device may be removed from a guest system in the DETACH command of an ISX/390.

The DEFINE command allows an ISX/390 operator to define an emulated printer keyboard, card punch devices, printers, or card reader devices for a guest system.

Only one printer keyboard can be defined. An ISX/390 operator's console is used to send data to be routed by a guest system to the printer keyboard. An ISX/390 operator will be able to enter the input data for the printer keyboard via the MODIFY command of OS/390:

F ISX_job_name,> . . . input data. . . .

For a card punch and printer emulation class of SYSOUT, data sets are specified in the corresponding DEFINE command line. A current SYSOUT data set is created and allocated to an ISX/390 for an emulated card punch or printer when a guest system begins communication with the device. The data set is not allocated when the RESET or CLOSE command is issued by an ISX/390 operator or by a guest system via the DIAGNOSE instruction for the corresponding device. The next I/O communication between a guest system with the device will push an ISX/390 to create and allocate new SYSOUT data set for the device emulation.

For a card reader emulation input, a sequential data set or a member of a partitioned data set has to be specified in the corresponding DEFINE command line for an emulated card reader. Input data set or a member is allocated to an ISX/390 when a guest system begins communication with the device. The data set is unallocated and the device is detached when the transmission of data ends, or when the RESET or CLOSE command is issued by an ISX/390 operator or by a guest system via the DIAGNOSE instruction for the device. It is possible to keep the device linked to the data set or member via NODET parameter of the DEFINE command. In this case, the next I/O communication of a guest system with the device will push an ISX/390 to allocate the data set for the device emulation process once.

The ACCOUNT command allows an ISX/390 operator to estimate I/O activities of a guest system with emulated I/O devices.

The DISPLAY command allows an ISX/390 operator to display dynamic characteristics of activities of emulated devices.

Controlling Emulated DASD I/O Devices

ISX/390 supports an emulated FBA DASD (looking like 9332) to be used by guest systems as a real FBA DASD.

Fixed-length relative record VSAM data sets with record length of 512 bytes are used for FBA DASD emulation.

The following procedure allows a guest system to use an emulated FBA DASD:

create a corresponding VSAM data set in OS/390 via the IDCAMS Utility Program, load this VSAM data set via the ISX/390 ISXFBI Utility Program, define the emulated FBA DASD for ISX/390 and the guest system via the DEFINE command of ISX/390.

A VSAM data set to be used for the FBA DASD emulation in ISX/390 is created via the OS/390 IDCAMS Utility Program as any other VSAM data set in OS/390. The IDCAMS program which may be called via OS/390 TSO command or from a batch job, is the following:

```
//ISXCR    JOB MSGLEVEL=(1,1),MSGCLASS=H,CLASS=A
//     EXEC PGM=IDCAMS
//SYSPRINT DD SYSOUT=H
//SYSIN DD *
    DEFINE CLUSTER -
        (NAME(DISK)      -
         NUMBERED        -
         SUBALLOCATION   -
         RECORDSIZE(512 512) -
         RECORDS(360036) -
         VOLUMES(DSKFBA) -
```

-continued

```
         SHAREOPTIONS(4) -
         REUSE)
/*
```

The IDCAMS, the VSAM data set name, the volume label on which the data set will reside, the space to be allocated for the data set and the attributes of the data set should be specified.

The data set name can be any name, which corresponds to standard OS/390 requirements for the VSAM data set names.

The size of the space to be allocated to the VSAM data set is defined according to the real 9332 FBA DASD size. The best of all is to specify the data set space in blocks. The number of blocks has to be equal to 360036 for the 9332 model 400 emulation or to 554800 for the 9332 model 600 emulation.

The VSAM data set must reside on one DASD volume and have one extent. Parameter SUBALLOCATION must be specified to allocate the required space in the volume.

To indicate that a fixed-length relative record VSAM data set with the record length of 512 bytes must be created, specify the NUMBERED parameter and RECORDSIZE parameter with the average and maximum record size being equal to 512.

The REUSE parameter is a VSAM function used by the ISX/390 Utility Program ISXFBI.

The VSAM data set can be the FBA DASD emulated via ISX/390 Utility Program ISXFBI. This program runs as a job in OS/390. The job for calling ISXFBI is the following:

```
//FBA       JOB MSGLEVEL=(1,1),MSGCLASS=H
//          EXEC PGM=ISXFBI
//STEPLIB   DD DSN=ISX.LINKLIB,UNIT=SYSDA,DISP=SHR
//SYSPRINT  DD SYSOUT=H
//
```

After a VSAM data set is created and prepared for FBA DASD emulation, one can use that data set to define the corresponding FBA DASD for a guest system.

Emulated FBA DASD are defined for a guest system in the DEFINE command of ISX/390. The device number is assigned to emulated FBA DASD via DEFINE command. The name of the corresponding VSAM data set used by ISX/390 for this FBA DASD emulation is also specified via the DEFINE command.

Controlling Emulated 3270 Devices

ISX/390 supports emulated 3270 display units (looking like 3274 Model 1D with Model 1, 2, 3, 4, or 5 screen, but without the QUERY capability) used by guest systems as real local non-SNA 3270. ISX/390 provides the capability of using emulated 3270 display units through VTAM Virtual Telecommunication Access Method.

Emulated 3270 display units are used with VTAM the following way:

ISX/390 has to be defined to VTAM as the application program within an application program major node by using an APPL definition statement.

ISX/390 VTAM session parameters have to be defined through the logon mode tables and through the VTAM and NCP definition statements.

A logical unit name of a VTAM terminal has to be defined for an emulated 3270 display unit.

The ISX/390 application program major node must be defined in the VBUILD definition statement. The ISX/390 application program minor nodes must be defined in one APPL definition statement for each ISX/390 application program in the major node.

For example,

| ISXNODE | VBUILD | TYPE=APPL | |
|---|---|---|---|
| APPLISXA | APPL | AUTH=ACQ, | permits to acquire LUs |
| | | EAS=3, | concurrent sessions |
| | | ACBNAME=APPLISXA, SRBEXIT=YES | application name authorized to use SRB |

Note that ISX/390 as an VTAM application program does not have its own name in the APPLID operand of the ACB macro. Therefore, VTAM uses the application program name specified as the job step name of the ISX/390 start up job. This name must be the same as the name of the APPL definition statement.

As the VTAM application program, ISX/390 supports emulated 3270 display units using logical units of type 0 or 2. OS/390 provides the logon mode table as a default for the LU type 0 and the LU type 2 3270 devices. The logon mode table can be used to create one's define 3270 characteristics in the logon mode table. The MODETAB and MODEENT macros can be used to define 3270 characteristics in logon mode table.

The following are examples of table entry definitions:
The MODEENT macro for Non-SNA 3270.
name MODEENT FMPROF=X'02',
  TSPROF=X'02',
  PRIPROT=X'71',
  SECPROT=X'40',
  COMPROT=X'20000',
  PSERVIC=X' . . . ' see Note 1
The MODEENT macro for SNA 3270.
name MODEENT FMPROF=X'03',
  TSPROF=X'03',
  PRIPROT=X'B1',
  SECPROT=X'90',
  COMPROT=X'3080',
  RUSIZES=X' . . . ',
  PSERVIC=X' . . . ' see Note 1

Note 1. Coding the Device-Specific Hexadecimal Data of the PSERVIC operand.

| Hexadecimal code | Related device |
|---|---|
| X'00..00000000..........00' | For non-SNA (LU 0) |
| X'02..00000000..........00' | For SNA (LU 2) |
| X'..00.....................' | Device without extended data stream capability |
| X'..80.....................' | Device with extended data stream capability(it is not supported) |
| x'............0000000001..' | Buffer size 480 (12 × 40) only |
| X'............0000000002..' | Buffer size 1920 (24 × 80) only |
| X'............0C2800007E..' | for 480 or 960 (12 × 40 or 12 × 80) |
| X'............185020507F..' | for 1920 or 2560 (24 × 80 or 32 × 80) |
| X'............18502B507F..' | for 1920 or 3440 (24 × 80 or 43 × 80) |
| X'............18501B847F..' | for 1920 or 3564 (24 × 80 or 27 × 132) |
| X'............185000007E..' | for 1920 (24 × 80) only |

To prevent switching of screen size on a device that has more than one possible size, code the screen size as:
X' . . . 185000007E.'
in the PSERVIC operand.

Note that the alternate screen size defined by the display model number in the guest system has to correspond to the alternate screen size defined by PSERVIC operand.

The FMPROF, TSPROF, PRIPROT, SECPROT and COMPROT values shown in the examples have to be the same as those used in the default logon mode table.

The DEFINE command of ISX/390 has to be used to assign a logical unit name of VTAM terminal to an emulated 3270 display unit.

Several emulated 3270 display units can be defined with the same logical unit name. In this case the first defined display unit will be operational for the guest operating system and connected with the corresponding VTAM terminal. All other display units with the same logical unit name will be operational, but are set up in disconnect mode with respect to the VTAM terminal. In order to switch the VTAM terminal from one emulated display unit to another it is necessary to define for every display unit a functional key for VTAM terminal switch using the TAKE command.

In addition to the VTAM terminal switch capability the TAKE command permits redefining the logical unit name for an emulated display unit while the device remains operational for the guest operating system. This capability of the TAKE command permits switching an emulated display unit from one VTAM terminal to another.

If I/O errors or unusual conditions (such as VTAM termination) are detected while an emulated display unit is connected with a VTAM terminal, then the guest display unit is automatically set up in disconnect mode, but remains operational. The TAKE command permits reconnecting it with the same or another VTAM terminal.

You can request a connection with an emulated display unit via the VTAM LOGON command specifying the ISX/390 application program name (the job step name of the ISX/390 start up job) in the APPLID operand of the VTAM LOGON command.

The following is the first LOGON panel:

```
---------------- ISX/390 LOGON ----------------

Enter LOGON parameters below:

Gdevaddr  ===> _              PASSWORD  ===> message area

PF3-EXIT PF-9-CANCEL ENTER-SAVE

```

The Gdevaddr value defines the guest device number you can to connect the VTAM terminal. The PASSWORD value has to be entered, if it is specified in the corresponding DEFINE command for the Gdevaddr. The password specified will not appeared when you type it. The 'message area' of the panel is designed to display the following messages of the LOGON procedure:

Terminal is assigned to the guest device
Invalid guest device number
Invalid password
Device has predefined assignment The PF3 key has to be used to connect the VTAM terminal with the guest emulated display units assigned during LOGON procedure. The PF9 key has to be used to cancel previous assignments of the emulated display units and terminate the LOGON procedure. The ENTER key has to be used to go to the next panel of the LOGON procedure, if the guest device number and password are accepted.

The next panel is displayed with the guest functional key definitions:

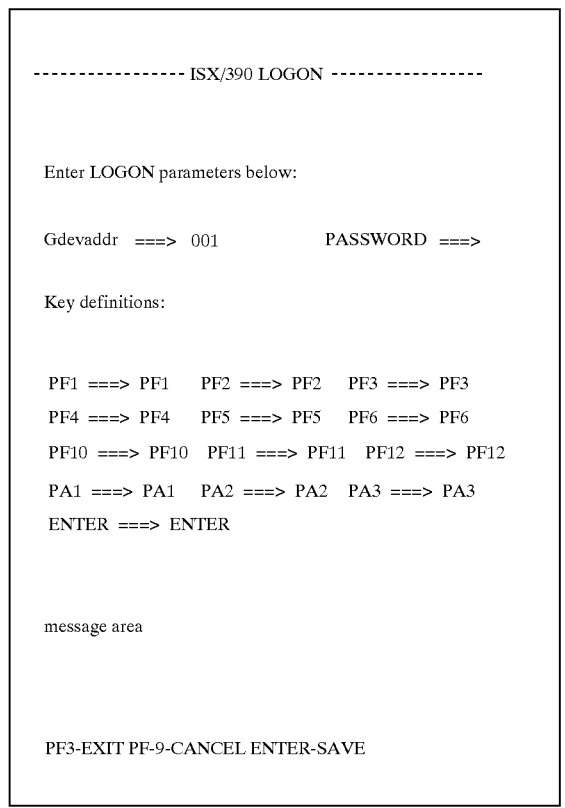

Usually functional keys of the emulated display unit correspond to functional keys of the real terminal. The panel is designed to redefine this correspondence or to assign special functions to functional keys of the real terminal. The current key definitions are shown by the symbol→on the panel.

Special functions are defined by the following keywords:

SYSREQ—functional key. The result of pressing the real TESTREQ or SYSREQ key is intercepted by the network and is not received by ISX/390. To emulate the TESTREQ or SYSREQ key for the guest display unit these keys have to be defined through another functional key.

SWITCH—terminal switch. In order to use the terminal with different emulated display units it is necessary to have the terminal switch function. This function can be assigned to any real functional key of the real terminal.

The 'message area' of the panel is designed for the following messages of the LOGON procedure:

Terminal is assigned to the guest device
Confirm or enter key definitions
Confirm or enter key definitions The PF3 key has to be used to connect the VTAM terminal with the guest emulated display unit. The PF9 key has to be used to cancel previous assignments of the emulated display units and terminate the LOGON procedure. The ENTER key has to be used to save parameters and to return to the first panel to define the connection of the terminal with the next guest emulated display unit or to terminate the LOGON procedure. The last emulated display unit becomes actually connected with the terminal while all other becomes disconnected.

The VTAM LOGOFF command allows you to terminate the session with an ISX/390 and to free the terminal. The guest display units currently connected with the terminal are automatically set up in disconnect mode, but remain operational for the guest system.

Controlling Guest Execution

A guest system can be loaded with the IPL command. The IPL command may be specified in the Command File of ISX/390 start up job or may be entered from ISX/390 console.

ISX/390 provides commands to simulate S/390 hardware interruptions to the guest system. ISX/390 operator can use:

The EXTERNAL command to simulate an external key interrupt to the guest system.

The RESTART command to restart the guest system in the interpretive space.

The SHUTDOWN command allows the operator to terminate all ISX/390 activities.

Several ISX/390 commands may be used to locate, display, and alter program instructions and data of a guest system in the interpretive space.

In the following discussions of STOP, DISPLAY, STORE and DUMP commands, it is important to understand the levels of storage specified on the command line. The first level storage is real storage of the computer. The second level storage, i.e. the interpretive space storage is 'real' storage of a guest. system. This includes the V=R partitions of VSE/ESA systems, or V=R regions of MVS/XA systems. The V=V partitions of VSE/ESA systems or regions of MVS/XA systems constitute the third level storage.

To stop execution of the guest at a given time, the empty input or the STOP command without operand may be used. When ISX/390 stops the guest running, it is possible to enter other commands to display and alter the storage, registers or PSW. To resume guest running on address in the current PSW it is necessary to enter the BEGIN command without an operand. If you have to resume a guest running at a specific address you may specify the address in the BEGIN command. To stop execution of the guest on a specific address, the STOP command with specified address may be used.

The contents of the interpretive space storage, storage protection keys, registers, and PSW can be displayed on the terminal using the DISPLAY command or can be written in a special SYSOUT—data set using the DUMP command.

The contents of the interpretive space storage, guest registers, and the PSW can be altered with the STORE command.The STORE command can be used to store the guest CPU status in corresponding guest storage locations.

The ACCOUNT command allows the ISX/390 operator to estimate ISX/390 job CPU time, guest CPU time, number of SIE instructions which were issued by ISX/390, number of SSCH instructions and number of long channel programs which were issued by a guest system.

Using Saved Guest System Images

A Saved Guest Image (SGI) is the special named copy of a guest system kept in a OS/390 data set and loaded by name instead of by I/O device number. Loading a guest image by name substantially reduces the time it takes to IPL a guest system in an ISX/390 interpretive space.

An SGI can be created via an ISX/390 SAVESYS command in the following manner. A guest system must be IPL-ed into the interpretive space from its resident I/O device. Further, at a user defined point of the guest execution, the SAVESYS command must be issued. A point of the guest system saving can be defined exactly using the ISX/390 STOP command or approximately on the basis of some event during the guest execution (for example, when all guest processes are in the wait state).

The following guest data are saved by the SAVESYS command:

General registers.

Access registers.

Floating-point registers.

Control registers.

Prefix register.

Program status word.

Clock comparator request information.

CPU timer request information.

Storage contents specified by the SAVESYS operands.

Storage protection keys of specified storage pages.

State of all I/O devices in current guest configuration.

If during saving the state of some I/O device an uncompleted I/O request for this device is encountered, then the corresponding notification message is issued to the operator.

To save a guest image, a corresponding OS/390 data set, named a Guest Image File (GIF), must exist. A corresponding GIF is a OS/390 VSAM data set with the identifier of SGI name, specified in the SAVESYS command, and with the following characteristics: ESDS type, reusable, multiple read or single write access, maximum and average record size of 4096 bytes.

To create a GIF the DEFINE command of the IDCAMS utility program has to be used. You may prepare and execute a corresponding job directly as well as any other job in OS/390.

When a GIF has been created and a guest image has been saved in the GIF, the IPL command can be used to load the guest image from the GIF into the interpretive space.

During an IPL command, the following guest data are restored exactly as they were saved in GIF:

General registers.

Access registers.

Floating-point registers.

Control registers.

Prefix register.

Program status word.

Clock comparator request information.

CPU timer request information.

Storage contents specified by the SAVESYS operands.

Storage protection keys of specified storage pages.

Restoration of the state of I/O devices saved in a GIF depends on the current guest I/O configuration during execution of IPL command. The state of some I/O device is restored from the GIF if the same I/O device exists in a current guest I/O configuration. A device is considered to be the same if it has the same type (emulated or real), the same device class and the same device number. After restoration of the I/O device state a subchannel number assigned to this device in current configuration will be the same as in the configuration on SAVESYS command.

For each I/O device whose state been saved in a GIF the corresponding message is issued to the operator. This message indicates that the state of an I/O device has been restored or not restored and contains the information about device type, device class, device number and corresponding subchannel number. Additional messages will be issued, if the state of some I/O device has been restored, but if this device had an I/O request which was not completed during the SAVESYS command.

Operator Command Description

The commands described in this document allow the operator to manage the resources of the system, to control guest execution, to reconfigure ISX/390 parameters and the I/O device subset, assigned to the guest system, and to simulate other functions of S/390.

Rotational Conventions

The following conventions are used in this publication to illustrate the format of commands:

Uppercase letters, terms, and punctuation marks must be coded exactly as shown.

Lowercase letters and terms represent variable information that must be supplied by the operator.

Information contained within brackets [ ] is optional. That is, it can be included or omitted, depending on the requirements of the operator. Two or more options between brackets and separated by a sign represent alternatives, one and only one of which may be chosen.

Information contained within braces { } and separated by a sign | represent alternatives, one and only one of which must be chosen.

An uppercase term concatenated with a lowercase term may be used to represent a command verb or an operand in which the uppercase term must be coded by the operator to identify the command.

A required blank space is indicated as such in the notation.

ACCOUNT Command

The ACCOUNT command is designed to display ISX/390 account data on the operator console.

The ACCOUNT command gives four data lines. The first data line displays the following account data:

total time the account function was operative (R-TIME), total ISX/390 job CPU time the account function was operative (T-TIME), total guest CPU time the account function was operative (G-TIME), if this function was activated by the SET command, total SIE instruction count the account function was operative (SIE), total SSCH instruction for real devices count the account function was operative (R-SIO), total SSCH instruction for emulated devices count the account function was operative (E-SIO), total long channel program count for real devices the account function was operative (LCP).

The second data line displays the following account data:

total ISX/390 job CPU time during utilization of which the account function was operative (T-TIME), total guest CPU time during utilization of which the account function was operative (G-TIME), if this function was activated by the SET command, total SIE instruction rate during which the account function was operative (SIE), total SSCH instruction rate for real devices during which the account function was operative (R-SIO), total SSCH instruction rate for emulated devices during which the account function was operative (E-SIO), total long channel program execution rate for real devices during which the account function was operative (LCP).

The third data line displays the following account data:

time since the previous ACCOUNT command was issued (R-TIME),

ISX/390 job CPU time from when previous ACCOUNT command was issued (T-TIME), guest CPU time from when previous ACCOUNT command was issued (G-TIME), if this function was activated by the SET command, SIE instruction count from previous ACCOUNT command was issued (SIE), SSCH instruction for real devices count from when the previous ACCOUNT command was issued (R-SIO), SSCH instruction for emulated devices count from when the previous ACCOUNT command was issued (E-SIO), long channel program count for real devices from when previous ACCOUNT command was issued (LCP).

The fourth data line displays the following account data:

ISX/390 job CPU time utilization from when previous ACCOUNT command was issued (T-TIME), guest CPU time utilization from when previous ACCOUNT command was issued (G-TIME), if this function was activated by the SET command, SIE instruction rate from when previous ACCOUNT command was issued (SIE), SSCH instruction rate for real devices from when the previous ACCOUNT command was issued (R-SIO), SSCH instruction rate for emulated devices from when the previous ACCOUNT command was issued (E-SIO), long channel program execution rate for real devices from when previous ACCOUNT command was issued (LCP).

ACCOUNT command format:

---
ACCount
---

The following responses and messages may be issued as the result of the ACCOUNT command execution:

| R-TIME | T-TIME | G-TIME | SIE | R-SIO | E-SIO | LCP |
|--------|--------|--------|---------|----------|----------|----------|
| xxxxxx | xxxxxx | xxxxxx | Xxxxxxx | xxxxxxxx | xxxxxxxx | xxxxxx |
|        | xxx %  | xxx %  | Xxx     | xxx      | xxx      | xxx |
| xxxxxx | xxxxxx | xxxxxx | Xxxxxxx | xxxxxxxx | xxxxxxxx | xxxxxxxx |
|        | xxx %  | xxx %  | Xxx     | xxx      | xxx      | xxx |
| —      | —      | —      | —       | —        | —        | — |

ATTACH Command

The ATTACH command is designed to assign a real I/O device to the guest I/O configuration.

ATTACH command format:

```
ATTach [devclass] [rdevaddr[.count]] [AS] [gdevaddr] [UNCond]
       List [gdevaddr[.count]]
``` devclass defines a class of the attached I/O device. If devclass is not specified, then the device class is received from OS/390. The following codes can be specified to define the device class:

DASD adds a CKD type direct access storage device with the rdevaddr real device number to the guest configuration at the device number specified by gdevaddr.

F512 adds a FBA type direct access storage device with the rdevaddr real device number to the guest configuration at the device number specified by gdevaddr.

TAPE adds a magnetic tape device with the rdevaddr real device number to the guest configuration at the device number specified by gdevaddr.

UREC adds a unit record device with the rdevaddr real device number to the guest configuration at the device number specified by gdevaddr.

GRAF adds a local display with the rdevaddr real device number to the guest configuration at the device number specified by gdevaddr.

TERM adds a telecommunication device with the rdevaddr real device number to the guest configuration at the device number specified by gdevaddr.

CTCA adds a channel-to-channel adapter with the rdevaddr real device number to the guest configuration at the device number specified by gdevaddr.

SPEC adds a special type device with the rdevaddr real device number to the guest configuration at the device number specified by gdevaddr.

rdevaddr is the real device number of the I/O device to be assigned.

.count
is a decimal value designating the number of real devices to be assigned starting with the real device at rdevaddr device number.
gdevaddr
is the guest device number which will be assigned to the I/O device. If gdevaddr is not specified, the real device number will be assigned to the I/O device.
UNCond
defines that the device must be attached even if it is not allocated to the ISX/390 job by OS/390.
LIST
gives the full list of attached real I/O devices and their states:
gdevaddr(rdevaddr)-s—for each real I/O device, where 's' is one of the following codes:
R—the device is ready for I/O,
N—the device is not operational,
A—the device is doing I/O,
I—I/O interruption is pending for the device.
LIST gdevaddr[.count]
gives the list of attached real I/O devices and their states in device number range specified by gdevaddr and count parameters.

The following responses and messages may be issued as the result of execution of the ATTACH command:
Real device xxxx attached as yyy
Guest has no attached I/O devices
Guest has no attached I/O devices in the address range
ISX10A Device xxx is not ready for I/O
ISX75A Device xxxx is not allocated to nnnnnnnn for yyy
ISX76A Device xxxx is out of OS/390
ISX79A Device yyy is already defined
ISX82A Device xxxx is already attached
ISX83W GETMAIN failed
ISX84A Operand missing or invalid
ISX85W LOAD failed for mmmmmm BEGIN Command The BEGIN command is designed to continue execution of a guest at either the specified storage address or the location pointed to by the current guest PSW.
BEGIN command format:

```
Begin [hexaddr]
``` hexaddr
is the hexadecimal storage address where guest execution is to begin.

The following messages may be issued as the result of execution of the BEGIN command:
ISX01I Guest is running
ISX05I Guest is stopped
ISX81A Interpretive space not available
ISX84A Operand missing or invalid
ISX92I Disable wait PSW=xxxxxxxx xxxxxxxx CLOSE Command The CLOSE command is designed to revoke the current linkages between emulated I/O devices and corresponding OS/390 data sets, or between active trace processing and SYSOUT data set used for trace record printing. The data sets are closed and unallocated from ISX/390 job, thus these data sets become available for using in OS/390.

CLOSE command format:

```
Close devclass | gdevaddr[.count] |
    TRace
``` devclass
defines a class of the I/O device to be closed. The following codes can be specified to define the device class:
RDR
READER
revokes current linkages with corresponding OS/390 input data sets for all emulated card reader devices (looks like 2540R).
PUN
PUNCHER
revokes current linkages with corresponding OS/390 output data sets for all emulated card punch devices (looks like 2540P).
PRT
PRINTER
revokes current linkages with corresponding OS/390 output data sets for all emulated printer devices (looks like 1403).
gdevaddr
defines the guest device number of the emulated device for which current linkage with corresponding OS/390 data set to be revoked.
.count
is a decimal value designating the number of emulated devices to be closed starting with the guest device at gdevaddr device number.
TRace
revokes current linkage with SYSOUT data set used to print traced records.

The following responses and messages may be issued as the result of execution of the CLOSE command:
Current file for xxx is closed
Current file for trace output is closed
ISX84A Operand missing or invalid
ISX91A Device xxx does not exist DEFINE Command The DEFINE command is designed to assign an emulated I/O device to the guest I/O configuration.
DEFINE command format:

```
DEFine [devclass gdevaddr[.count] [VIA]
    [Class x|
    DSname name[(member)] [NODET]|
    LUname llllllll [PASSword xxxxxxxx]
    ADAPTER rdevaddr PORT n [POLLing rr]]|
    List [gdevaddr[.count]]
``` devclass
defines a class of the defined I/O device. The following codes can be specified to define the device class:
CON
adds an emulated Console Printer Keyboard (looks like 3215) to the guest configuration at the device number specified by gdevaddr.

RDR
　　adds an emulated card reader device (looks like 2540R) to the guest configuration at the device number specified by gdevaddr.
PUN
　　adds an emulated card punch device (looks like 2540P) to the guest configuration at the device number specified by gdevaddr.
PRT
　　adds an emulated printer device (looks like 1403) to the guest configuration at the device number specified by gdevaddr.
FBA
　　adds an emulated FBA DASD (looks like 9332) to the guest configuration at the device number specified by gdevaddr.
GRF
　　adds an emulated local non-SNA display unit (looks like 3274 Model ID with Model 1, 2, 3, 4, 5 screen without QUERY capability and with no alternate screen defined) to the guest configuration at the device number specified by gdevaddr.
TRS
　　adds an emulated token-ring adapter to the guest I/O configuration at the device numbers beginning from gdevaddr.
gdevaddr
is the guest device number which will be assigned to the I/O device. For an emulated token-ring adapter gdevaddr, gdevaddr+1, gdevaddr+2, and gdevaddr+3 will be assigned.
.count
is a decimal value designating the number of emulated devices to be defined starting with the guest device at gdevaddr device number.
CLass
defines SYSOUT class of data sets associated with emulated PRT or PUN device (Default value is A).
DSname
defines name of sequential data set or member name and name of partitioned data set to be used to receive data for emulated RDR device. Defines name of VSAM data set to be used for emulation of the FBA DASD.
LUname llllllll
defines the logical unit name which will be used to connect the guest device gdevaddr with a VTAM logical unit. The VTAM logical unit has to be LU type 0 or 2. If logical unit name is defined as LOGON, then the emulated device can be connected with a real VTAM terminal via the LOGON procedure of ISX/390.
PASSword
defines customer's password for connection with the emulated display when the session is initiated from a VTAM terminal.
ADAPTER rdevaddr
defines the real device numbers rdevaddr and rdevaddr+1 of the real token-ring adapter to be allocated for ISX/390 job for emulation of the guest token-ring adapter.
PORT n
defines the port n of a real token-ring adapter to be used by an ISX/390 job for emulation of the guest token-ring adapter.
POLLing rr
defines polling time interval rr to read inbound/outbound request parameters of the guest system. Valid rr values are the following:

32—to read parameters every 32 milliseconds
　　16—to read parameters every 16 milliseconds
　　8—to read parameters every 8 milliseconds
　　4—to read parameters every 4 milliseconds
　　2—to read parameters every 2 milliseconds
The default rr value is 32.
NODET
defines that emulated RDR device has not to be detached on end of data condition in associated data set or member.
LIST
gives the full list of defined emulated I/O devices and its state:
　　gdevaddr(CON)-s—for emulated console,
　　gdevaddr(RDR)-s—for each emulated card reader,
　　gdevaddr(PUN)-s—for each emulated card punch,
　　gdevaddr(PRT)-s—for each emulated printer,
　　gdevaddr(FBA)-s—for each emulated FBA DASD,
　　gdevaddr(GRF)-s—for each emulated 3270,
　　gdevaddr(TRS)-s—for each emulated token-ring adapter,
　　where 's' is one of the following codes:
　　　　R—the device is ready for I/O,
　　　　N—the device is not operational,
　　　　A—the device is doing I/O,
　　　　I—I/O interruption is pending for the device.
LIST gdevaddr[.count]
gives the list of defined emulated I/O devices and their states in device number range specified by gdevaddr and count parameters.
The following responses and messages may be issued as the result of execution of the DEFINE command:
　　Emulated console xxxx is defined
　　Emulated device xxxx is defined. SYSOUT=x
　　Emulated device xxxx is defined. DSNAME=nnn . . . n
　　Emulated device xxxx is defined. LUNAME=llllllll
　　Password xxxxxxxx accepted
　　Emulated Token-Ring Adapter xxxx.4 is defined via port n of real token-ring adapter yyyy.2
　　Interrupt port xxxx is full emulated
　　Control port xxxx is full emulated with polling interval of nn mlsec
　　Inbound port xxxx is emulated via yyyy
　　Outbound port xxxx is emulated via yyyy
　　Guest has no emulated I/O devices
　　Guest has no emulated I/O devices in the address range
　　ISX29W VTAM RPL-based macro error. LUNAME= llllllll, GRC=gc, RTNCD=rc, FDB2=ec, SENSE= ssmmuuuu
　　ISX30A LU type of llllllll is not supported
　　ISX40A ISX/390 job jjjjjjjj is not connected with VTAM
　　ISX41I Guest message to xxxx, jjjjjjjj>>mhmhmhmh chchchch
　　ISX42I Guest message from xxxx, jjjjjjjj<<mhmhmhmh chchchch
　　ISX43W Unknown guest message to xxxx, jjjjjjjj
　　ISX44W Unknown real message from xxxx, jjjjjjjj
　　ISX45W Mismatch send/receive sequense numbers: ss/rr jjjjjjjj ISX46I Real message from xxxx, jjjjjjjj is discarded ISX47I Real message from xxxx, jjjjjjjj<<dddddddddddd . . .

ISX48I Real message to xxxx, jjjjjjjj>>dddddddddddd . . .

ISX78A Console is already defined

ISX79A Device xxxx is already defined

ISX83W GETMAIN failed

ISX84A Operand missing or invalid

ISX85W LOAD failed for mmmmmmmmm

ETACH Command

The DETACH command is designed to remove a device from the guest configuration.

DETACH command format:

```
DETach gdevaddr[.count]
``` gdevaddr is the guest device number of the I/O device to be removed from the guest configuration.

.count is a decimal value designating the number of devices to be detached starting with the guest device at gdevaddr device number.

The following responses and messages may be issued as the result of execution of the DETACH command:

ISX32I Device xxx detached

ISX84A Operand missing or invalid

ISX91A Device xxx does not exist

DISPLAY Command

The DISPLAY command is designed to display the following data from the guest system environment:

Interpretive space storage (guest real storage) contents.

Primary virtual storage contents.

Secondary virtual storage contents.

Home virtual storage contents.

Interpretive space storage protection keys.

Guest general registers.

Guest access registers.

Guest Floating-point registers.

Guest Control registers.

Guest program status word.

Guest I/O device(s) states.

Guest I/O configuration.

Guest CPU state.

DISPLAY command format:

```
Display {Psw
        [R|P|S|H]hexaddr1-hexaddr2|
        [R|P|S|H]hexaddr1.count|
        Khexaddr1-hexaddr2|
        Khexaddr1.count|
        G[reg1[-reg2]]|
        Z[reg1[-reg2]]|
        Y[reg1[-reg2]]|
        X[reg1[-reg2]]|
        Ugdevaddr[.count] [CCW]|
        IOC|
        CPU}
```

R, P, S or H defines the guest storage which has to be displayed. R defines that the guest real storage has to be displayed. P defines that the current guest primary virtual storage has to be displayed. S defines that the current guest secondary virtual storage has to be displayed. H defines that the current guest home virtual storage has to be displayed.

hexaddr1 is the hexadecimal location address that is to be displayed. The specified storage contents are displayed in hexadecimal and with EBCDIC translation. If the prefix R, P, S or H is not specified, then the currently visible guest storage (real, primary virtual, secondary virtual or home) is to be displayed.

Khexaddr1 is the hexadecimal guest real location address that is to be displayed. The storage protection keys are displayed in hexadecimal.

-hexaddr2 is the last of the range of hexadecimal location addresses, whose contents are to be displayed.

.count is a hexadecimal value designating the number of bytes of storage to be displayed starting with the byte at hexaddr1.

G[reg1[-reg2]]

displays the contents of the general registers. If G is specified without a register number, the contents of all the general registers are displayed. If only reg1 is specified, then only reg1 contents are to be displayed. If both reg1 and reg2 are specified, then the contents of all general registers from reg1 to reg2 are to be displayed.

Z[reg1[-reg2]]

displays the contents of the access registers. If Z is specified without a register number, the contents of all the access registers are displayed. If only reg1 is specified, then only reg1 contents are to be displayed. If both reg1 and reg2 are specified, then the contents of all access registers from reg1 to reg2 are to be displayed.

Y[reg1[-reg2]]

displays the contents of the floating-point registers. If Y is specified without a register number, the contents of all the floating-point registers are displayed. If only reg1 is specified, then only reg1 contents are to be displayed. If both reg1 and reg2 are specified, then the contents of all floating-point registers from reg1 to reg2 are to be displayed.

X[reg1[-reg2]]

displays the contents of the control registers. If X is specified without a register number, the contents of all the control registers are displayed. If only reg1 is specified, then only reg1 contents are to be displayed. If both reg1 and reg2 are specified, then contents of all control registers from reg1 to reg2 are to be displayed.

Ugdevaddr[.count] [CCW]

displays messages about states of guest I/O device(s) and currently executed I/O operations beginning from the device with gdevaddr device number. If count is specified, then it displays corresponding messages for specified number of devices. If CCW is specified, then it displays last executed guest channel program.

IOC displays the guest I/O configuration messages.

CPU displays messages about real and guest CPU identifiers, guest prefix, machine check interruptions pending, and external interruptions pending.

Psw displays the current guest Program Status Word.

Note. Empty input command line is treated as the request to stop the DISPLAY command execution.

The following responses and messages may be issued as the result of execution of the DISPLAY command:

PSW=xxxxxxxx xxxxxxxx
Gnn=yyyyyyyy
Xnn=yyyyyyyy
Yn=xxxxxxxxxxxxxxxx
aaaaaaaa xxxxxxxx xxxxxxxx xxxxxxxx xxxxxxxx xxxxxxxx * . . . *
aaaaaaaa to bbbbbbbb line(s) same as above
aaaaaaaa to bbbbbbbb not accessible storage
aaaaaaaa to bbbbbbbb key=xx
CCCC XXXX(YYYY) DEVICE STATUS
Connected data set: nnnnnnnnnnnnnnnn(mmmmmmmm)
Connected data set: SYSOUT=x
Connected logical unit: llllllll
Real/Interpreted I/O requests: rrrrrrrr/iiiiiiii
NOT READY/READY NOT ALLOCATED/ALLOCATED NOT SHARED/SHARED NOT RESERVED/RESERVED
Active requests: NONE/START I/O/CLEAR/RESET/CLOSE/DETACH

| Device state: | I/O REDRIVED / I/O HAS COMPLETED / I/O IN PROGRESS / DEVICE IS BUSY / DEVICE NOT USED / I/O NOT COMPLETED |
|---|---|

Current SCSW: xxxxxxxx xxxxxxxx xxxxxxxx
Expected I/O interruption(s):
Pending SCSW: xxxxxxxx xxxxxxxx xxxxxxxx
Emulating SCSW: xxxxxxxx xxxxxxxx xxxxxxxx
Expected SCSW: xxxxxxxx xxxxxxxx xxxxxxxx
. . .
Last ORB: xxxxxxxx xxxxxxxx xxxxxxxx Last (or currently) executed channel program:
aaaaaaaa: xxxxxxxx xxxxxxxx gggggggg: yyyyyyyy yyyyyyyy

| | | |
|---|---|---|
| ... | >> zzzzzzzz | >> uuuuuuuu |
| ... | | |

Currently interpreted channel command word: xxxxxxxx xxxxxxxx
Guest I/O configuration is empty
Guest has the following I/O configuration:

| Subchannel | Device | Class | |
|---|---|---|---|
| ssss | dddd | cccc | Real\|Emulated |
| .... | .... | .... | ......... |

CPU STATUS
Real CPUID: cccccccc/mmmm Guest CPUID: bbbbbbbb/nnnn
Guest CPU prefix: pppppppp
Pending machine-check interruptions: mmmm/NONE
Pending channel report words: rrrr/NONE
Pending external interruptions: [NONE]
External key
Emergency signal
External call
Service call
Clock comparator
CPU timer
ISX74A Invalid storage length
ISX80A Invalid guest storage address
ISX81A Interpretive space not available
ISX84A Operand missing or invalid UMP Command The DUMP command is designed to produce a dump of the guest system environment including:
   Guest (real, current primary virtual, current secondary virtual or current home virtual) storage locations and its protection keys.
   Guest general registers.
   Guest access registers.
   Guest Floating-point registers.
   Guest Control registers.
   Guest program status word.
   All parameters established by the SET command for the guest interpretive space.
   Special SYSOUT data set is dynamically created by ISX/390 to contain the dump.

DUMP command format:

| DUMP [Real \| Primary \| Secondary \| Home] |
|---|
| hexaddr1-hexaddr2 \| hexaddr1.count ... |

Real
   defines that guest real storage has to be dumped.
Primary
   defines that current guest primary virtual storage has to be dumped.
Secondary
   defines that current guest secondary virtual storage has to be dumped.

Home
defines that current guest home virtual storage has to be dumped.

Note. If neither 'real' nor 'primary' nor 'secondary' nor 'home' does not specified, then the guest storage type is defined via the guest PSW and the guest control registers.

hexaddr1
is the hexadecimal location address that is to be dumped. The storage contents are dumped in hexadecimal and with EBCDIC translation.

-hexaddr2
is the last of the range of hexadecimal location addresses, whose contents are to be dumped.

.count
is a hexadecimal value designating the number of bytes of storage to be dumped starting with the byte at hexaddr1.

The following responses and messages may be issued as the result of execution of the DUMP command:

Dump of guest real storage in progress
End of dump
Guest storage not defined
ISX17W DYNALLOC failed
ISX67W OPEN failed
ISX80A Invalid guest storage address
ISX84A Operand missing or invalid EXTERNAL Command The EXTERNAL command is designed to simulate an external key interruption to the guest.

EXTERNAL command format:

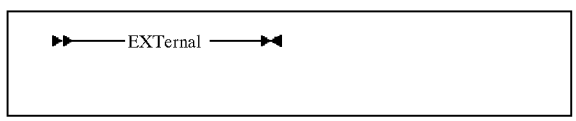

The following response may be issued as the result of the EXTERNAL command execution:

External interruption is submitted

IPL Command

The IPL command is designed to simulate an initial program loading of the guest system.

IPL command format:

gdevaddr
is the guest device number of the I/O device that contains the guest loader.

filename
is the name of VSAM file with guest image to be loaded.

STOP
halts the guest during the IPL just before the initial PSW is loaded.

NOCLEAR
defines that the guest environment has not to be clear reset and CPU status has to be stored before initial program loading.

ATTN [gdevaddra]
generates an attention interruption from the specified guest device with the device number gdevaddra or from the guest console during the IPL.

PARM pppppppp
defines up to eight characters of data to be available for IPL'ed guest system as load parameters.

The following responses and messages may be issued as the result of the IPL command execution:

nnnnnnnn system restored
ISX03W Password and expiration date must be defined before IPL
ISX05I Guest is stopped . . . at address xxxxxx
ISX06I Initial reset has done
ISX08I Device xxxx is ready for I/O
ISX10A Device xxxx is not ready for I/O
ISX31W Unpredictable IPL CCW sequence
ISX34I Clear reset has done
ISX53I Real/Emulated cccc xxxx on subchannel ssss tttt
ISX55I Incompatible guest image data and guest mode
ISX56I VSAM 'mmmmmm' macro failed. RC=xx,EC=yyy
ISX57I Unexpected end of guest image file
ISX58I Inconsistent guest image file data
ISX59A Insufficient interpretive space size
ISX60A Device xxxx has pending I/O request
ISX66A Device xxxx had pending I/O request
ISX70A IPL channel program error
ISX71A Invalid IPL device type
ISX73A IPL device error. CC=cc CSW=ddss
ISX75A Device xxxx is not allocated to nnnnnnnn for yyyy
ISX81A Interpretive space not available

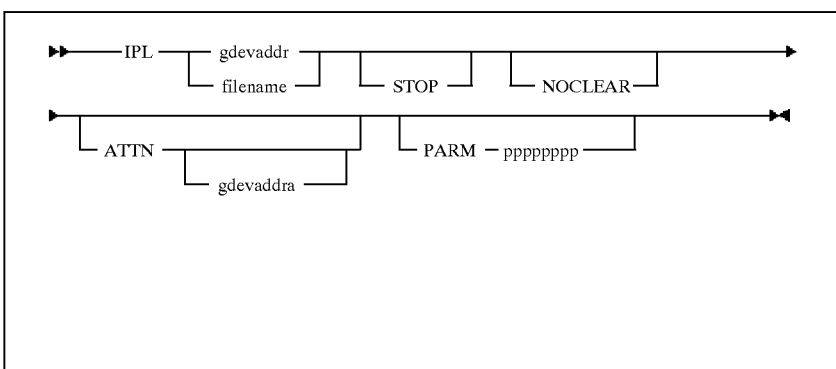

ISX84A Operand missing or invalid

ISX91A Device xxxx does not exist

READY Command

The READY command is designed to examine and set operational status of a specified real device.

READY command format:

---
READY gdevaddr[.count]
--- gdevaddr
  defines that the I/O device with the guest device number of gdevaddr is to be examined and set up.
.count
  is a decimal value designating the number of devices to be examined starting with the guest device at gdevaddr device number.

The following responses and messages may be issued as the result of the execution of the READY command:

ISX08I Device xxx is ready for I/O

ISX09I Device xxx is active

ISX10A Device xxx is not ready for I/O

ISX75A Device xxxx is not allocated to nnnnnnnn for yyy

ISX83W GETMAIN failed

ISX84A Operand missing or invalid

ISX91A Device xxx does not exist

RESET Command

The RESET command is designed to reset the guest environment or the I/O device assigned to the guest.

RESET command format:

---
RESET [gdevaddr[.count]]
--- gdevaddr
  defines that the I/O device with the guest device number of gdevaddr is to be reset. If the device is the emulated one and is linked to SYSOUT data set, this link is revoked, the data set is closed and unallocated. If gdevaddr is not specified, then all guest environments and all guest I/O devices are to be reset and all device links with the SYSOUT data sets are to be revoked.
.count
  is a decimal value designating the number of devices to be reset, starting with the guest device at gdevaddr device number.

The following responses and messages may be issued as the result of the execution of the RESET command:

ISX08I Device xxx is ready for I/O

ISX10A Device xxx is not ready for I/O

ISX33I Device xxx is reset

ISX34I Clear reset has done

ISX84A Operand missing or invalid

ISX91A Device xxx does not exist

RESTART Command

The RESTART command is designed to restart the guest system. When this command is entered the current guest PSW is saved at the guest storage address of X'08' and the guest resumes the execution at the address in PSW loaded from the interpretive space storage location X'00'.

RESTART command format:

---
RESTART
---

The following responses and messages may be issued as the result of the execution of the RESTART command:

Guest restart

ISX81A Interpretive space not available

SAVESYS Command

The SAVESYS command is designed to create the guest image in specified OS/390 VSAM file. The saved guest image may be used by the IPL command to restore the guest in the interpretive space.

The following guest data are saved by the SAVESYS command:

General registers.

Access registers.

Floating-point registers.

Control registers.

Program status word.

Clock comparator request information.

CPU timer request information.

Storage contents specified by the SAVESYS operands.

Storage protection keys of specified storage pages.

SAVESYS command format:

---
SAVEsys name {fpage1-lpage1 [fpage2-lpage2]...|
              fpage1.count1 [fpage2.count2]...}
--- name
  specifies an existing VSAM file name where the guest image to be saved.
fpage1 fpage2 . . .
  is the hexadecimal page number of the first page in the range to be saved together with its storage protection keys as a part of the guest image.
-lpage1 -lpage2 . . .
  is the hexadecimal page number of the last page in the range, whose contents is to be saved.
.count1 .count2 . . .
  is a hexadecimal value designating the number of pages in the range to be saved starting with the pagen1 page.

The following responses and messages may be issued as the result the SAVESYS command execution:

'nnnnnnnn' system saved

ISX54I Too many page ranges

ISX56I VSAM 'mmmmmm' macro failed. RC=xx, EC=yyy

ISX57I Unexpected end of guest image file

ISX61W Inconsistent VSAM data set attributes

ISX80A Invalid guest storage address

ISX81A Interpretive space not available

ISX83W GETMAIN failed

ISX84A Operand missing or invalid

SET Command

The SET command is designed to define functional parameters of the interpretive space for the guest system.

SET command format:

```
SET [AUTOPoll|ACCount|VMmode|ASSist|JOBName|XMSG|
MSG ON|OFF
 CONSname consolename|OFF
 STorage nnM
 IDP ppppppppmmmm
  DATE dd/mm/yyyy TIME hh/mm/ss
  ZONE [-|+]hh/mm
   RATIO rrrr/vvvv|OFF|FORCE
   PASSword xxxxxxxx
    EXPire mm/yyyy
    List]
```

AUTOPoll controls whether or not ISX/390 tests each BTAM autopoll CCW to see if it has been dynamically modified.

ACCount controls whether or not ISX/390 performs the account function.

VMmode defines the equivalence of the ISX/390 interpretive space and a VM/ESA virtual machine. The following subcodes of the DIAGNOSE instruction are supported for the interpretive spaces:
 000—store extended system id
 008—execute ISX/390 command
 00C—store pseudo timer value
 010—free storage page
 024—query device & type features
 028—modify channel program dynamically
 060—get guest storage size ASSist defines execution of the guest system in the interpretive space with or without interpretive execution assistance.

JOBName controls whether or not ISX/390 displays an ISX/390 job name before displaying all messages to an ISX/390 operator.

MSG controls whether or not ISX/390 issues all messages and responses to an ISX/390 operator or only messages with the 'attention' suffix A or W in their identifiers.

XMSG controls whether or not ISX/390 issues all messages about operation and I/O exceptions in the guest system.

CONSname consolename defines the name of an OS/390 console to be used to communicate with ISX/390 and the emulated printer keyboard of a guest system.

ON indicates that the AUTOPOLL, ACCOUNT, VMMODE, ASSIST, JOBNAME, MSG, XMSG functions are activated.

OFF indicates that AUTOPOLL, ACCOUNT, VMMODE, ASSIST, JOBNAME, MSG, XMSG, CONSNAME functions are deactivated.

STorage nnnnM defines the interpretive space size in the virtual fixed storage of a region as nnnnM, where nnnn is a number from 1 to 2047.

IDP ppppppppmm defines the CPU pppppppp and model mmmm identifiers for the guest system.

DATE dd/mm/yyyy defines initial date for the interpretive space in the form of dd/mm/yyyy, where dd is a day, mm is a month number, and yyyy is a year number.

TIME hh/mm/ss defines initial clock value for the interpretive space in form of hh/mm/ss, where hh is an hour number, mm is a minute number, and ss is a second number.

ZONE [-|+]hh/mm defines the time zone value in the form of hh/mm, where hh is number of hours, mm is number of minutes. The time zone value is added to OS/390 current time to define the local time for a guest system.

RATIO rrrr/vvvv defines the virtual time mode for the guest system beginning from the moment the SET command and the RATIO operand have been entered. The time rate for the guest system Tv is defined as Tv=Tr/k, where Tr is the real time rate and k is the ratio of rrrr and vvvv values. These values are decimal digits defining the time slices in milliseconds. The rrrr value defines the real time slice to update the guest system's time.

RATIO OFF defines the virtual time mode for the guest system with the setting 1/k instead of the previously defined ratio k up to the moment of the guest system's virtual and real time equivalince.

RATIO FORCE deactivate the virtual time mode for the guest system immediately.

PASSword defines a customer's password for usage of ISX/390.

EXPire defines the expiration date for validity of the ISX/390 license.

List gives the full list of functional parameters set for the interpretive space.

The following responses and messages may be issued upon the of execution of the SET command:

Autopoll—ON

Autopoll—OFF

Interpretive space size is nnM

Information messages will be issued

Information messages will not be issued

Account—ON

Account—OFF

VM mode execution—ON

VM mode execution—OFF

Execution with assists—ON

Execution with assists—OFF

Date=dd/mm/yyyy, Clock=hh/mm/ss is set up

Time zone hh/mm is set up

CPU and MODEL identifiers pppppppp/mmmm accepted

Real CPU and MODEL identifiers assumed

Virtual time mode—ON

Virtual time mode—OFF

Virtual time mode—FORCED

Password xxxxxxxx accepted

Expiration date mm/yyyy accepted

No specific console name is defined

Console name nnnnnnnn is defined
Specific console name is canceled
Guest exception messages—ON
Guest exception messages—OFF
ISX/390 job name—ON
ISX/390 job name—OFF
ISX11W ATTENTION! VALIDITY OF THE ISX/390 LICENCE HAS ELAPSED
ISX12W Validity of the ISX/390 licence is expiring
ISX13A Console nnnnnnnn is not active
ISX14A Console validation service not available
ISX15A Specified console name nnnnnnnn not defined in OS/390
ISX16W CONVCON failed
ISX72A Invalid operand combination
ISX81A or invalid SHUTDOWN Command The SHUTDOWN command is designed to cancel all ISX/390 operations for the guest system.
SHUTDOWN command format:

```
SHUTDOWN
```

The following responses and messages may be issued upon the execution of the SHUTDOWN command:

| R-TIME | T-TIME | G-TIME | SIE | R-SIO | E-SIO | LCP |
|---|---|---|---|---|---|---|
| xxxxxx | xxxxxx xxx % | xxxxxx xxx % | xxxxxxxx xxx | Xxxxxxxx Xxx | Xxxxxxxx Xxx | xxxxxx xxx |
| xxxxxx | xxxxxx xxx % | xxxxxx xxx % | xxxxxxxx xxx | Xxxxxxxx Xxx | Xxxxxxxx Xxx | xxxxxxxx xxx |
| — | — | — | — | — | — | — |

ISX32I Device xxx detached
ISX35I Shutdown completed for ISX/390 job jjjjjjjj

STOP Command

The STOP command is designed to halt guest execution processing.
STOP command format:

```
[STOP] [hexaddr|OFF]
``` hexaddr
  is the hexadecimal value that defines which address in the current guest PSW will halt guest execution processing. If the hexaddr value is not specified, then the current guest address is assumed.
OFF
  cancels previously issued request to halt the guest on a specified address.
  Note. An empty input command line is treated as the STOP command without an operand.

The following responses and messages may be issued upon the execution of the STOP command:
  Stop at address xxxxxxxx is cancelled
  Stop at address xxxxxxxx is requested
  ISX05I Guest is stopped [ . . . at address xxxxx]
  ISX80A Invalid guest storage address ISX81A Interpretive space not available
ISX84A Operand missing or invalid TORE Command The STORE command is designed to alter the following guest environment:
  Interpretive space storage (guest real storage) contents.
  Primary virtual storage contents.
  Secondary virtual storage contents.
  Home virtual storage contents.
  Guest general registers.
  Guest access registers.
  Guest floating-point registers.
  Guest control registers.
  Guest program status word.

The STORE command permits to store the guest CPU status.
STORE command format:

```
STore {[R|P|S|H]hexaddr hexdata |
        Greg hexword1 ...|
        Zreg hexword1 ...|
        Yreg hexdoubleword1 ...|
        Xreg hexword1 ...|
        Psw hexdoubleword|
        CPU}
```

R, P, S or H
  defines the guest storage to be altered. R defines the guest real storage to be altered. P defines the current guest primary virtual storage to be altered. S defines the current guest secondary virtual storage to be altered. H defines the current guest home virtual storage has to be altered.
hexaddr
  is the hexadecimal location address to be altered. If the prefix R, P, S or H is not specified, then the currently visible guest storage (real, primary virtual, secondary virtual or home) is to be altered.
hexdata
  stores the hexadecimal data (hexdata) starting at the address specified by the hexaddr hexadecimal value.
Greg hexword1 . . .
  stores the hexadecimal word(s) of data in successive general registers starting at the register specified by reg.
Zreg hexword1 . . .
  stores the hexadecimal word(s) of data in successive access registers starting at the register specified by reg.
Xreg hexword1 . . .
  stores the hexadecimal word(s) of data in successive control registers starting at the register specified by reg.
Yreg hexdoubleword1 . . .
  stores the hexadecimal doubleword(s) of data in successive floating-point registers starting at the register specified by reg.

Psw hexdoubleword
  stores the hexadecimal doubleword of data in the guest Program Status Word.
CPU
  stores the guest CPU status (CPU timer value, clock comparator value, current PSW, prefix value, access registers contents, floating point registers contents, general registers contents, and control registers contents) in the corresponding assigned storage locations of the guest storage.

The following responses and messages may be issued upon the execution of the STORE command:
  Store completed
  ISX74A Invalid storage length
  ISX80A Invalid guest storage address
  SX81A Interpretive space not available
  SX84A Operand missing or invalid TAKE Command The TAKE command is designed to redefine guest device characteristics, which were previously defined via the ATTACH or the DEFINE or the TAKE command.

For all guest devices the TAKE command permits to redefine guest device numbers. For emulated 3270 display units the TAKE command permits to redefine functional keys and logical unit names of the corresponding real devices.

TAKE command format:

```
Take gdevaddr[.count] [AS] newgdevaddr |
     gdevaddr[.count] code1 [AS] code2 |
     gdevaddr[.count] [AS] LUname 11111111
``` gdevaddr
  defines that a characteristics of the guest I/O device with the guest device number gdevaddr are to be redefined.
.count
  is a decimal value designating the number of devices to be redefined starting with the guest device at gdevaddr device number.
newgdevaddr
  specifies that the guest I/O device with the guest device number of gdevaddr has to have the new guest device number of newgdevaddr.
code1
  the following codes can be specified to define the functional keys to be redefined for emulated 3270 display unit(s):

| | |
|---|---|
| ENTER | enter function key |
| PF1 | program function 1 key |
| PF2 | program function 2 key |
| PF3 | program function 3 key |
| PF4 | program function 4 key |
| PF5 | program function 5 key |
| PF6 | program function 6 key |
| PF7 | program function 7 key |
| PF8 | program function 8 key |
| PF9 | program function 9 key |
| PF10 | program function 10 key |
| PF11 | program function 11 key |
| PF12 | program function 12 key |
| PA1 | program attention 1 key |
| PA2 | program attention 2 key |
| PA3 | program attention 3 key | code2
  the following codes can be specified to define the new functions for the code1 keys:

| | |
|---|---|
| ENTER | enter function key |
| PF1 | program function 1 key |
| PF2 | program function 2 key |
| PF3 | program function 3 key |
| PF4 | program function 4 key |
| PF5 | program function 5 key |
| PF6 | program function 6 key |
| PF7 | program function 7 key |
| PF8 | program function 8 key |
| PF9 | program function 9 key |
| PF10 | program function 10 key |
| PF11 | program function 11 key |
| PF12 | program function 12 key |
| PA1 | program attention 1 key |
| PA2 | program attention 2 key |
| PA3 | program attention 3 key |
| TESTREQ | test request function key |
| SYSREQ | system request function key |
| SWITCH | terminal switch key |

The terminal switch function permits to switch from the real terminal used for emulation of the guest device gdevaddr to the next emulated guest device with the same logical unit name as was defined via the DEFINE or the TAKE command.

LUname llllllll
  specifies the logical unit name of a corresponding real device for emulated 3270 display unit(s).

The following responses and messages may be issued upon the of execution of the TAKE command:
  Device xxxx redefined as yyyy
  Key code1 of device xxxx redefined as code2
  ISX36A The command is not applicable to device xxxx
  ISX38I Device xxxx has switched to LU llllllll
  ISX79A Device yyy is already defined
  ISX83W GETMAIN failed
  ISX84A Operand missing or invalid
  ISX91A Device xxx does not exist TRACE Command The TRACE command is designed to receive information about the events happening in the guest system which events are visible to ISX/390.

TRACE command format:

```
TRace [event codes] [filter]
      [Display] [Print Class x] [Halt] [Skip nnnnn]
      [ON|OFF]
``` event codes
  the following codes can be specified to define the guest events the TRACE command is applicable:
  ITC—unknown interception code
  STOP—guest system is stopped
  WAIT—guest system in wait state
  LCTL—the LCTL instruction issued by the guest system SIGP—the SIGP instruction issued by the guest system
DIAG—the DIAG instruction issued by the guest system
STIDP—the STIDP instruction issued by the guest system
SCK—the SCK instruction issued by the guest system
SPX—the SPX instruction issued by the guest system
STPX—the STPX instruction issued by the guest system
STAP—the STAP instruction issued by the guest system
SERVC—the SERVC instruction issued by the guest system
TB—the TB instruction issued by the guest system
CSCH—the CSCH instruction issued by the guest system
HSCH—the HSCH instruction issued by the guest system
RSCH—the RSCH instruction issued by the guest system
MSCH—the MSCH instruction issued by the guest system
SAL—the SAL instruction issued by the guest system
SSCH—the SSCH instruction issued by the guest system
STSCH—the STSCH instruction issued by the guest system
TSCH—the TSCH instruction issued by the guest system
STCRW—the STCRW instruction issued by the guest system
STCPS—the STCPS instruction issued by the guest system
RCHP—the RCHP instruction issued by the guest system
SCHM—the SCHM instruction issued by the guest system
TPI—the TPI instruction issued by the guest system
I/O—I/O interruption or interception occurred
EXT—external interruption or interception occurred
M/C—machine-check interruption occurred
P/C—program-check interruption occurred
CCW—channel program executed by the guest system If no event codes are specified, then all event codes are assumed.

filter the following operands can be specified as the filter to emprecise guest events the TRACE command is applicable:

---
Ugdevaddr[.count]
--- gdevaddr
defines that I/O instructions and interruptions have to be traced for the guest device with the device number of gdevaddr .count
is a decimal value designating the number of devices starting with the device number of gdevaddr for which I/O instructions and interruptions have to be traced.

Display
defines that an event has to be displayed on the ISX/390 operator console.

Print CLass x
defines that an event has to be printed using SYSOUT— data set with SYSOUT class x. The data set is dynamically allocated by the TRACE command.

Halt
defines that the guest system has to be stopped when an event has occurred.

Skip nnnnn
defines that the trace functions requested have to be activated, when nnnnn traced events have occurred.

ON
defines that previously specified trace parameters are set on.

OFF
defines that previously specified trace parameters are set off.

If neither ON nor OFF is specified, then ON assumed. An operand combination of a new TRACE command line is logically added to or subtracted from the active opeand combination. The empty operand combination with the operand OFF at the end means that the TRACE function has to be stopped.

The following responses and messages can be displayed and printed as the result of execution of the TRACE command:

Trace—ON

Trace—OFF

ISX17W DYNALLOC failed

ISX67W OPEN failed

ISX72A Invalid operand combination

ISX84A Operand missing or invalid

ISX91A Device xxx does not exist

ISX25I INV ITC cc PSW xxxxxxxx xxxxxxxx

ISX25I STOP PSW xxxxxxxx xxxxxxxx

ISX25I I/O ITV mm PSW xxxxxxxx xxxxxxxx

ISX25I WAIT mm PSW xxxxxxxx xxxxxxxx

ISX25I LCTL x,y aaaaaaaa PSW xxxxxxxx xxxxxxxx

ISX25I SIGP x,y aaaaaaaa PSW xxxxxxxx xxxxxxxx

ISX25I DIAG x,y aaaaaaaa PSW xxxxxxxx xxxxxxxx

ISX25I STIDP aaaaaaaa PSW xxxxxxxx xxxxxxxx

ISX25I SCK aaaaaaaa PSW xxxxxxxx xxxxxxxx

ISX25I SPX aaaaaaaa PSW xxxxxxxx xxxxxxxx

ISX25I STPX aaaaaaaa PSW xxxxxxxx xxxxxxxx

ISX25I STAP aaaaaaaa PSW xxxxxxxx xxxxxxxx

ISX25I SERVC x,y PSW xxxxxxxx xxxxxxxx

ISX25I TB x,y PSW xxxxxxxx xxxxxxxx

ISX25I CSCH dddd PSW xxxxxxxx xxxxxxxx

ISX25I HSCH dddd PSW xxxxxxxx xxxxxxxx

ISX25I RSCH dddd PSW xxxxxxxx xxxxxxxx

ISX25I MSCH dddd aaaaaaaa PSW xxxxxxxx xxxxxxxx

ISX25I . . . mmff pppppppp

ISX25I SAL llllllll PSW xxxxxxxx xxxxxxxx

ISX25I SSCH dddd aaaaaaaa PSW xxxxxxxx xxxxxxxx

ISX25I . . . ORB xxxxxxxx xxxxxxxx xxxxxxxx

ISX25I dddd CCW aaaaaaaa xxxxxxxx xxxxxxxx

ISX25I dddd IDAW aaaaaaaa xxxxxxxx

ISX25I STSCH dddd aaaaaaaa PSW xxxxxxxx xxxxxxxx

ISX25I . . . SCSW xxxxxxxx xxxxxxxx xxxxxxxx

ISX25I TSCH dddd aaaaaaaa PSW xxxxxxxx xxxxxxxx

ISX25I . . . SCSW xxxxxxxx xxxxxxxx xxxxxxxx

ISX25I STCRW aaaaaaaa PSW xxxxxxxx xxxxxxxx

ISX25I STCPS aaaaaaaa PSW xxxxxxxx xxxxxxxx

ISX25I RCHP id PSW xxxxxxxx xxxxxxxx

ISX25I SCHM bbbbbbbb PSW xxxxxxxx xxxxxxxx
ISX25I TPI mm aaaaaaaa PSW xxxxxxxx xxxxxxxx
ISX25I . . . dddd pppppppp
ISX25I I/O INT dddd pppppppp PSW xxxxxxxx xxxxxxxx
ISX25I EXT INT cccc pppppppp PSW xxxxxxxx xxxxxxxx
ISX25I EXT ITV mmmm PSW xxxxxxxx xxxxxxxx
ISX25I M/C INT PSW xxxxxxxx xxxxxxxx
ISX25I P/C INT cccc aaaaaaaa PSW xxxxxxxx xxxxxxxx
ISX25I ???? cccc PSW xxxxxxxx xxxxxxxx

SX/390 MESSAGES

ISX/390 messages have the following message format:
ISXnns text
Where:
ISX—ISX/390 program product name,
nn—message serial number,
s—message type code:
   I—information; no operator action is required,
   A—action; the operator must perform a specific action,
   W—warning; action has to be determined and performed.
text—message text.

ISX01I Guest is running
This message is issued when the guest system is executed by ISX/390.

ISX02W Device xxx—I/O buffer overflow. Channel program is cute down
This message is issued when ISX/390 detects that translation buffers used to convert a guest channel program for the xxx device to OS/390 form are overflowed. The guest channel program is truncated.

ISX03W Password and expiration date must be defined before IPL
This message is issued when initial program loading of the guest system is requested before ascertaining the customer's password and the expiration date for ISX/390.

ISX05I Guest is stopped [ . . . at address xxxxxx] [ . . . by the guest itself]
This message is issued, when ISX/390 stops execution of the guest system by request of an ISX/390 operator or by request of the guest system itself via the DIAGNOSE instruction.

ISX06I Initial reset is done
This message is issued when during the execution of the IPL command with the NOCLEAR operand store CPU status and initial CPU reset have performed.

ISX08I Device xxx is ready for I/O
This message is issued when ISX/390 detects that the specified device is operational.

ISX09I Device xxx is active
This message is issued when ISX/390 detects that the specified device is doing I/O.

ISX10A Device xxx is not ready for I/O
This message is issued for the real device with guest device number xxx, when the READY Command Processor detects that the device is not operational.
This message is issued for the emulated device, when the guest system or ISX/390 has issued an I/O request, but ISX/390 cannot allocate or open the data set defined in the DEFINE command for the device or receive storage of the input buffer.

ISX11W ATTENTION! VALIDITY OF THE ISX/390 LICENCE HAS ELAPSED
This message is issued when the validity of the ISX/390 licence has elapsed.

ISX12W Validity of the ISX/390 licence is expiring
This message is issued 30 days before the validity of the ISX/390 licence will expires.

ISX13A Console nnnnnn is not active
This message is issued during the execution of the SET command if specified console nnnnnnnn is not active.

ISX14A Console validation service not available
This message is issued during execution of the SET command if the console validation service of the CONVCON macro currently is not available.

ISX15A Specified console name nnnnnnnn not defined in OS/390
This message is issued during the execution of the SET command if specified console name nnnnnnn is not defined in OS/390.

ISX16W CONVCON failed
This message is issued during the execution of the SET command if any error is detected during the execution of the CONVCON macro.

ISX17W DYNALLOC failed
This message is issued, if any error is detected during the execution of the DYNALLOC macro.

ISX18W Incorrect state of ISX/390 Common Area. Reply R to reinitialize it or C to check it again.
This message is issued to an ISX/390 operator, if an incorrect state of the ISX/390 Common Area is detected during ISX/390 initialization. Reply 'R' reinitialize the area if ISX/390 is alone in the system. Reply 'C' is possible if other ISX/390 jobs are in the shutdown process.

ISX19A Invalid reply, try again.
This message is issued to an ISX/390 operator, an incorrect reply is entered by the operator for ISX18W request.

ISX20W ISX/390 job jjjjjjjj abnormally terminated
This message is issued to ISX/390 operator, when an abnormal termination of ISX/390 has occurred.

ISX21W No SDWA has built by OS/390
This message is issued to an ISX/390 operator, if no SDWA has been built for ESTAE Exit routine of ISX/390.

ISX22W Completion code cccccc Reason code rrrrrrrr
This message is issued to an ISX/390 operator to display a completion code cccccc and a reason code rrrrrrrr (if the last one is supported).

ISX23W Percolation has occurred
This message is issued to an ISX/390 operator, if percolation has occurred, when ESTAE Exit routine of ISX/390 receives control from OS/390.

ISX24W Unexpected interception with code cc
This message is issued when ISX/390 receives interception with an interception code of cc. The guest system has stopped.

ISX25I message text
These messages are displayed or printed when the ISX/390 trace function is active with the DISPLAY or PRINT option. The 'message text' is one of the following:
   NV ITC cc PSW xxxxxxxx xxxxxxxx
      defines that interception of the guest system with the invalid code cc has occurred.
   The guest PSW is xxxxxxxx xxxxxxxx.
   STOP PSW xxxxxxxx xxxxxxxx
      defines that the guest system is stopped.
   The guest PSW is xxxxxxxx xxxxxxxx.
   I/O ITV mm PSW xxxxxxxx xxxxxxxx
      defines that I/O intervention has occurred because I/O interruption pending for the guest system.
   The guest I/O interruption subclass mask is mm.
   The guest PSW is xxxxxxxx xxxxxxxx.
   WAIT mm PSW xxxxxxxx xxxxxxxx
      defines that the guest system is in the wait state.

The guest I/O interruption subclass mask is mm.
The guest PSW is xxxxxxxx xxxxxxxx.
LCTL x,y aaaaaaaa PSW xxxxxxxx xxxxxxxx
   defines that the LCTL instruction is issued by the guest system to change interruption masks.
Control registers from x to y are changed.
The control registers contents are at aaaaaaaa location.
The guest PSW is xxxxxxxx xxxxxxxx.
SIGP x,y aaaaaaaa PSW xxxxxxxx xxxxxxxx
   defines that the SIGP instruction is issued by the guest system.
The instruction operands are x, y, aaaaaaaa.
The guest PSW is xxxxxxxx xxxxxxxx.
DIAG x,y aaaaaaaa PSW xxxxxxxx xxxxxxxx
   defines that the DIAG instruction is issued by the guest system.
The instruction operands are x, y, aaaaaaaa.
The guest PSW is xxxxxxxx xxxxxxxx.
SCK aaaaaaaa PSW xxxxxxxx xxxxxxxx
   defines that the SCK instruction is issued by the guest system.
The instruction operand is aaaaaaaa.
The guest PSW is xxxxxxxx xxxxxxxx.
SPX aaaaaaaa PSW xxxxxxxx xxxxxxxx
   defines that the SPX instruction is issued by the guest system.
The instruction operand is aaaaaaaa.
The guest PSW is xxxxxxxx xxxxxxxx.
STPX aaaaaaaa PSW xxxxxxxx xxxxxxxx
   defines that the STPX instruction is issued by the guest system.
The instruction operand is aaaaaaaa.
The guest PSW is xxxxxxxx xxxxxxxx.
STAP aaaaaaaa PSW xxxxxxxx xxxxxxxx
   defines that the STAP instruction is issued by the guest system.
The instruction operand is aaaaaaaa.
The guest PSW is xxxxxxxx xxxxxxxx.
SERVC x,y PSW xxxxxxxx xxxxxxxx
   defines that the SERVC instruction is issued by the guest system.
The instruction operands are x, y.
The guest PSW is xxxxxxxx xxxxxxxx.
TB x,y PSW xxxxxxxx xxxxxxxx
   defines that the TB instruction is issued by the guest system.
The instruction operands are x, y.
The guest PSW is xxxxxxxx xxxxxxxx.
CSCH dddd PSW xxxxxxxx xxxxxxxx
   defines that the CSCH instruction is issued by the guest system.
The device number is dddd.
The guest PSW is xxxxxxxx xxxxxxxx.
HSCH dddd PSW xxxxxxxx xxxxxxxx
   defines that the HSCH instruction is issued by the guest system.
The device number is dddd.
The guest PSW is xxxxxxxx xxxxxxxx.
HSCH dddd PSW xxxxxxxx xxxxxxxx
   defines that the RSCH instruction is issued by the guest system.
The device number is dddd.
The guest PSW is xxxxxxxx xxxxxxxx.
MSCH dddd aaaaaaaa PSW xxxxxxxx xxxxxxxx
   defines that the MSCH instruction is issued by the guest system.
The device number is dddd.
The guest subchannel information block address is aaaaaaaa.
The guest PSW is xxxxxxxx xxxxxxxx.
. . . mmff pppppppp
   defines the continuation of the MSCH instruction record, if the instruction has performed with CC=0.
The interruption subclass code is mm.
The path management control word flags are ff.
The I/O interruption parameter is pppppppp.
SAL llllllll PSW xxxxxxxx xxxxxxxx
   defmes that the SAL instruction is issued by the guest system.
The guest address limit value is llllllll.
The guest PSW is xxxxxxxx xxxxxxxx.
SSCH dddd aaaaaaaa PSW xxxxxxxx xxxxxxxx
   defines that the SSCH instruction is issued by the guest system.
The device number is dddd.
The guest operation request block address is aaaaaaaa.
The guest PSW is xxxxxxxx xxxxxxxx.
. . . ORB xxxxxxxx xxxxxxxx xxxxxxxx
   defines the continuation of the SSCH instruction record, if the instruction has performed with CC=0.
The operation request bock is xxxxxxxx xxxxxxxx xxxxxxxx.
   dddd CCW aaaaaaaa xxxxxxxx xxxxxxxx
      defines that the guest channel program has the CCW.
The device number is dddd.
The guest address of the CCW is aaaaaaaa.
The guest CCW is xxxxxxxx xxxxxxxx.
   dddd IDAW aaaaaaaa xxxxxxxx xxxxxxxx
      defines that the guest channel program has the IDAW.
The device number is dddd.
The guest address of the IDAW is aaaaaaaa.
The guest IDAW is xxxxxxxx xxxxxxxx.
STSCH dddd aaaaaaaa PSW xxxxxxxx xxxxxxxx
   defines that the STSCH instruction is issued by the guest system.
The device number is dddd.
The guest subchannel information block address is aaaaaaaa.
The guest PSW is xxxxxxxx xxxxxxxx.
. . . SCSW xxxxxxxx xxxxxxxx xxxxxxxx
   defines the continuation of the STSCH instruction record, if the instruction has performed with CC=0 and data stored in the subchannel information block.
The subchannel status word is xxxxxxxx xxxxxxxx xxxxxxxx.
   TSCH dddd aaaaaaaa PSW xxxxxxxx xxxxxxxx
      defines that the TSCH instruction is issued by the guest system.
The device number is dddd.
The guest interruption response block address is aaaaaaaa.
The guest PSW is xxxxxxxx xxxxxxxx.
. . . SCSW xxxxxxxx xxxxxxxx xxxxxxxx
   defines the continuation of the TSCH instruction record, if the instruction has performed with CC=0 or CC=1 and none zero data stored in the interruption response block.
The subchannel status word is xxxxxxxx xxxxxxxx xxxxxxxx.
STCRW aaaaaaaa PSW xxxxxxxx xxxxxxxx
   defines that the STCRW instruction is issued by the guest system.

The guest location address for the channel report word is aaaaaaaa.

The guest PSW is xxxxxxxx xxxxxxxx.

STCPS aaaaaaaa PSW xxxxxxxx xxxxxxxx
    defines that the STCPS instruction is issued by the guest system.

The guest location address for the channel path status is aaaaaaaa.

The guest PSW is xxxxxxxx xxxxxxxx.

RCHP id PSW xxxxxxxx xxxxxxxx
    defines that the RCHP instruction is issued by the guest system.

The channel path identifier is id.

The guest PSW is xxxxxxxx xxxxxxxx.

SCHM bbbbbbbb PSW xxxxxxxx xxxxxxxx
    defines that the SCHM instruction is issued by the guest system.

The measurement mode control bits are bbbbbbbb.

The guest PSW is xxxxxxxx xxxxxxxx.

TPI mm aaaaaaaa PSW xxxxxxxx xxxxxxxx
    defines that the TPI instruction is issued by the guest system.

The guest I/O interruption subclass mask is mm.

The guest I/O interruption code address is aaaaaaaa.

The guest PSW is xxxxxxxx xxxxxxxx.

. . . dddd pppppppp
    defines the continuation of the TPI instruction record, if the instruction has performed with CC=1.

The device number is dddd.

The I/O interruption parameter is pppppppp.

I/O INT dddd pppppppp PSW xxxxxxxx xxxxxxxx
    defines that I/O interruption is reflected to the guest system.

The device number is dddd.

The I/O interruption parameter is pppppppp.

The guest PSW is xxxxxxxx xxxxxxxx.

EXT INT cccc pppppppp PSW xxxxxxxx xxxxxxxx
    defines that external interruption is reflected to the guest system.

The interruption code is cccc.

The interruption parameter is pppppppp, if it is an service call external interruption.

The guest PSW is xxxxxxxx xxxxxxxx.

EXT ITV mmmm PSW xxxxxxxx xxxxxxxx
    defines that external intervention has occurred because external interruption pending for the guest system.

The guest external interruption mask is mmmm.

The guest PSW is xxxxxxxx xxxxxxxx.

M/C INT PSW xxxxxxxx xxxxxxxx
    defines that machine-check interruption is reflected to the guest system.

The guest PSW is xxxxxxxx xxxxxxxx.

P/C INT cccc aaaaaaaa PSW xxxxxxxx xxxxxxxx
    defines that program interruption has occurred in the guest system.

The interruption code is cccc.

The guest page/segment fault address is aaaaaaaa.

The guest PSW is xxxxxxxx xxxxxxxx.

ISX25I ???? cccc PSW xxxxxxxx xxxxxxxx
    defines that operation exception program interruption has occurred in the guest system.

The operation code is cccc.

The guest PSW is xxxxxxxx xxxxxxxx.

ISX26I Program exception on instruction cccc IC=ii

This message is issued when ISX/390 receives program interruption on instruction with operation code of ccc and interruption code of ii.

ISX27W ATTENTION! INCORRECT PASSWORD IS SPECIFIED FOR ISX/390

This message is issued, when incorrect password was specified for ISX/390.

ISX28W Device xxxx I/O error. op csw s

This message is issued, when ISX/390 detects I/O error during execution of the guest I/O request for the device xxxx. In this message 'op' is operation code of the last executed CCW, 'csw' is the subchannel status word, 's' is the first sense byte.

ISX29W VTAM RPL-based macro error. LUNAME=llllllll, GRC=gc, RTNCD=rc, FDB2=ec, SENSE=ssmmuuuu This message is issued, when VTAM returns control to the ISX/390 with error or special-condition information about the requested RPL-based operation. In this message 'LUNAME' defines the logical unit name of the device, 'GRC' defines the general return code, 'RTNCD' defines the recovery action return code, 'FDB2' defines the specific error return code or conditional completion return code, if 'RTNCD' defines zero. 'SENSE' is set only for certain RTNCD/FDB2 combinations; it contains system-sense information (the first byte), system-sense modifier information (the second byte) and user-sense information (the last two bytes).

ISX30A LU type of llllllll is not supported

This message is issued, when not supported logical unit (neither LU type 0 nor LU type 2) is defined by the LUNAME operand of the DEFINE command.

ISX31W Unpredictable IPL CCW sequence

This message is issued during execution of the IPL command if the first channel command word of the guest IPL channel program for FBA disk is not READ IPL.

ISX32I Device xxxx detached

This message is issued when the device xxxx is detached.

ISX33I Device xxxx is reset

This message is issued when the device xxxx is reset.

ISX34I Clear reset has done

This message is issued when all guest environment is reset.

ISX35I Shutdown completed for ISX/390 job jjjjjjjj

This message is issued when ISX/390 shutdown has completed.

ISX36A The command is not applicable to device xxxx

This message is issued when the ISX/390 operator is trying to redefine characteristics of device xxxx, but the TAKE command is not applicable to the device.

ISX38I Device xxxx has switched to LU llllllll

This message is issued when the ISX/390 operator has switched an emulated 3270 display unit to the real terminal with LU name of llllllll.

ISX39W Session llllllll terminated, device xxxx disconnected

This message is issued when the session with the VTAM terminal nnnnnnn has been terminated due to I/O problems for emulated 3270 display unit xxxx. The device xxxx remains operational for the guest system, but not connected with a VTAM terminal.

ISX40A ISX/390 job jjjjjjjj is not connected with VTAM

This message is issued if ISX/390 is not defined as the VTAM application program or I/O problems was detected while opening ISX/390's VTAM ACB or on the SETLOGON macro.

ISX41I Guest message to xxxx, jjjjjjjj>>mhmhmhmh chchchch

This message is issued when the outbound message with the message header mhmhmhmh and the CIOA header chchchch is sent by the guest system to the outbound port xxxx of ISX/390 job jjjjjjjj.

ISX42I Guest message from xxxx, jjjjjjjj<<mhmhmhmh chchchch

This message is issued when the inbound message with the message header mhmhmhmh and the CIOA header chchchch is received by the guest system from the inbound port xxxx of ISX/390 job jjjjjjjj.

ISX43W Unknown guest message to xxxx, jjjjjjjj

This message is issued when unknown type message is received by ISX/390 from the guest inbound port xxxx of ISX/390 job jjjjjjjj ISX44W Unknown real message from xxxx, jjjjjjjj This message is issued when unknown type message is received by ISX/390 from the real input device for the guest inbound port xxxx of ISX/390 job jjjjjjjj.

ISX45W Mismatch send/receive sequense numbers: ss/rr jjjjjjjj

This message is issued when mismatch ss/rr is detected between send and receive sequense numbers of data transfer process of ISX/390 job jjjjjjjj.

ISX46I Real message from xxxx, jjjjjjjj is discarded

This message is issued when a message is received by ISX/390 from the real input device for the guest inbound port xxxx of ISX/390 job jjjjjjjj, but was not reflected to the guest system.

ISX47I Real message from xxxx, jjjjjjjj<<dddddddddddd . . .

This message is issued when a message is received by ISX/390 from the real input device xxxx for the guest inbound port of ISX/390 job jjjjjjjj.

ISX48I Real message to xxxx, jjjjjjjj>>dddddddddddd . . .

This message is issued when a message is sent by ISX/390 to the real output device xxxx by request of the guest outbound port of ISX/390 job jjjjjjjj.

ISX53I Real/Emulated cccc xxxx on subchannel ssss tttt

This message is issued during execution of the IPL filename command for each guest device. The code cccc defines guest device class, the code xxxx defines guest device number, the code ssss defines subchannel number of the device the text tttt defines the result of the device state restoration (restored/not restored).

ISX54A Too many page ranges

This message is issued during execution of the SAVESYS filename command, if more than 127 page ranges have been specified in the SAVESYS command line.

ISX55W Incompatible guest image data and guest mode

This message is issued during execution of the IPL filename command, if the mode in which guest image is allowed to be loaded and the guest mode are incompatible.

ISX56W VSAM mmmmmmmm macro failed. RC=x, EC=yyy

This message is issued, if VSAM macro named in this message has non-zero return code. This VSAM macro return code is displayed in RC field, corresponding error code is displayed in EC field of this message.

ISX57W Unexpected end of guest image file

This message is issued during execution of the IPL filename command, if the end of corresponding OS/390 VSAM disk file has been encountered while more guest image data are expected to exist.

ISX58W Inconsistent guest image file data

This message is issued during execution of the IPL filename command, if corresponding OS/390 VSAM disk file has been found, but contains data, which are inconsistent with specified guest size image data.

ISX59A Insufficient interpretive space storage

This message is issued during execution of the IPL filename command, if the ISX/390 interpretive space storage size is less than minimum storage size required to load the guest image.

ISX60A Device xxxx has pending I/O request

This message is issued during execution of the SAVESYS command, if the guest device xxxx has pending I/O operation.

ISX61W Inconsistent VSAM data set attributes

This message is issued during execution of the SAVESYS filename command, if specified file is not VSAM ESDS file or maximum record length of specified file is less than 4096 bytes.

This message is issued, if corresponding VSAM data set has been found, but its attributes are not suitable for emulation of a FBA DASD.

ISX62A Inconsistent VSAM data set attributes

This message is issued during VSAM data set loading procedure for FBA DASD to prompt operator to enter the name of VSAM data set to be used to emulate FBA DASD device.

ISX63A No data set allocated

This message is issued during execution of the initialization procedure for FBA DASD, if VSAM data set name, specified by operator as reply to ISX63W message, cannot be allocated.

ISX64A Confirm request to initialization. Reply U to continue initialization or T to terminate This message is issued during execution of the initialization procedure for FBA DASD to prompt operator to confirm request.

ISX65A Continue initialization? Reply Y or N

This message is issued during execution of the initialization procedure for FBA DASD to prompt operator for next VSAM data set processing or end of the procedure.

ISX66A Device xxxx had pending I/O request

This message is issued during execution of the IPL filename command, if the guest device xxxx had pending I/O operation on the SAVESYS command.

ISX67W OPEN failed

This message is sent to the operator, when ISX/390 detects that an ISX/390 load module library cannot be opened.

ISX68W SYSEVENT failed

This message is sent to the operator, when ISX/390 detects that non-swappable mode of ISX/390 execution in OS/390 can not be set up.

ISX70A IPL channel program error

This message is issued when any errors are encountered in a channel program during guest initial program loading process.

ISX71A Invalid IPL device type

This message is issued when the operator is trying to perform IPL command having specified the device that is not supported by ISX/390.

ISX72A Invalid operand combination

This message is issued if ISX/390 detects invalid sequence of specified operands in a command line.

ISX73A IPL device error. CC=cc CSW=ddss

This message is issued when any I/O errors are encountered during guest initial program loading process. CC=cc defines condition code, CSW=ddss defines device and subchannel status of the last I/O operation.

ISX74A Invalid storage length

This message is issued, if specified data has invalid length or if specified guest storage address plus specified data length is out of the guest address space.

ISX75A Device xxxx is not allocated to nnnnnnn for yyy

This message is issued, if the real device xxxx is not allocated by OS/390 to ISX/390 job nnnnnnnn for the guest device yyy.

ISX76A Device xxxx is out of OS/390

This message is issued, when ISX/390 cannot receive data about device xxxx from OS/390.

ISX77A Invalid command—xxxxxxxx

This message is issued, when ISX/390 cannot recognize entered command text xxxxxxxx.

ISX78A Console is already defined

This message is issued, when the operator is trying to define the console device using the DEFINE command, but console device is already defined for the guest I/O configuration.

ISX79A Device xxx is already defined

This message is issued, when the operator is trying to define using the DEFINE command xxx device that is already defined for the guest I/O configuration.

ISX80A Invalid guest storage address

This message is issued, if guest storage address specified in a command line is out of the guest interpretive space.

ISX81A Interpretive space not available

This message is issued, when any operation with the guest storage is required by the operator, but the interpretive space storage is not defined by the SET command.

ISX82A Device xxxx is already attached

This message is issued, when the operator is trying to attach real device xxxx that is already attached to the guest I/O configuration.

ISX83W GETMAIN failed

This message is issued during execution of a command processor if ISX/390 region or SQA of OS/390 has no enough free storage for allocation.

ISX84A Operand missing or invalid

This message is issued if ISX/390 cannot recognize specified operand or required operand does not specified in a command line.

ISX85W LOAD failed for mmmmmm

This message is sent to the operator, when ISX/390 detects that an ISX/390 module mmmmmm cannot be loaded by the LOAD macro.

ISX86W IDENTIFY failed

This message is sent to the operator, when ISX/390 detects error on the IDENTIFY macro.

ISX88A Input not accepted

This message is sent to the system operator when ISX/390 input buffer is busy by the previous input or the console device does not defined for the guest.

ISX89I Guest reading is cancelled

This message is sent to the system console to indicate that the read operation initiated by the guest system for the guest console device is cancelled.

ISX90A Guest is reading

This message is sent to the system console to indicate that the read operation is initiated by the guest system for the guest console device.

ISX91A Device xxx does not exist

This message is issued, if an operation is required for the device xxx not defined in the guest I/O configuration.

ISX92I Disable wait PSW=xxxxxxxx xxxxxxxx

This message is issued, when ISX/390 detects that the current guest PSW has I/O and external interrupts system mask turned off and wait bit turned on. The guest system is placed in stopped state.

ISX93I Complex E/P interrupt loop. PSW=xxxxxxxx xxxxxxxx

This message is issued, when complex of external/program interrupt loop has been detected during execution of the guest system.

ISX94I External interrupt loop. PSW=xxxxxxxx xxxxxxxx

This message is issued, when external interrupt loop has been detected during execution of the guest system.

ISX95I Program interrupt loop. PSW=xxxxxxxx xxxxxxxx

This message is issued, when program interrupt loop has been detected during execution of the guest system.

ISX96A ISX/390 initialization failed

This message is issued, if errors has been detected during ISX/390 initialization process.

ISX98W ESTAE failed

This message is issued, if ISX/390 cannot define its own abnormal end exit routine.

ISX99I ISX/390 initialization completed

This message is issued, when ISX/390 initialization has been successfully completed.

Glossary of abbreviations:

| | |
|---|---|
| API | APPLICATION PROGRAMMING INTERFACE |
| APPC | APPLICATION PROGRAM-TO-PROGRAM CONNECTION |
| APPN | ADVANCED PEAR-TO-PEAR NETWORK |
| CICS | IBM SOFTWARE PRODUCT |
| CKD | COUNT KEY DATA |
| CTC | CHANNEL-TO-CHANNEL |
| DASD | DORECT ACCESS STORAGE DEVICE (DISKS) |
| DCE | DISTRIBUTED COMPUTER ENVIRONMENT |
| DDK | AN IBM UTILITY |
| DHCF | DPPX HOST COMMUNICATION FACILITY |
| DPPX | IBM OPERATING SYSTEM |
| ESCON | CHANNEL |
| FBA | FIXED BLOCK ARCI-UTECTURE |
| FICON | FIBER CONNECTION (CHANNEL S/390) |
| HCF | HOST COMMUNICATION FACILITY |
| ICA | INTEGRATED COMMUNICATION ADAPTER |
| IPL | INTEGRATED PROGRAM LOADING |
| ISX | INTERPRETIVE SPACE EXECUTIVE |
| IT | INFORMATION TECHNOLOGIES |
| LPAR | LOGICAL PARTITION |
| LRTE | LOCAL REMOTE TERMINAL EMULATION |
| LU | LOGICAL UNIT (THE NAME OF THE PROTOCOL, FOR EXAMPLE LU2.0, LU6.2) |
| MVS | IBM OPERATING SYSTEM |
| OS/390 | OPERATING SYSTEM/390 |
| OSA-2 | OPEN SYSTEM ADAPTER |
| PC COM | PC COMMUNICATION |
| RACF | RESOURCE ACCESS CONTROL FACILITY |
| RVA | RAMAC VIRTUAL ARRAY (DASD IBM) |
| S/390 | SYSTEM/390 |
| SAF | SYSTEM AUTHORIZATION FACILITY |
| SNA | SYSTEM NETWIORK ARCHITECTURE |
| SOD | STATEMENT OF DIRECTION |
| SYSPL.EX | MULTI-COMPUTER IBM COMPLEX |
| TCP/IP | TRANSPORT CONTROL PROTOCOL/INTERNET PROTOCOL |
| TELNET | TELECOMMUNICATION NETWORK |
| TRN | TOKEN RING |
| VCTC | VIRTUAL CHANNEL-TO-CHANNEL |
| VDAT | VIRTUAL DATE |
| VICA | VIRTUAL INTEGGRATED COMMUNICATION ADAPTER |
| VM/ESA | OPERATING SYSTEM |
| VSAM | VIRTUAL SEQUENTIAL ACCESS NET'HOD |
| VSE | IBM OPERATING SYSTEM |
| VRAM | VIRTUAL TELECOMMUNICATION ACCESS METHOD |
| VTBAE | VIRTUAL TIME |
| VTRN | VIRTUAL TOKEN RING |

What is claimed is:

1. A system comprising a single IBM S/390 computer architecture running an OS/390 operating system, and at least two guest systems executing within the S/390 computer architecture, each guest system comprising an execution space within which a guest program or operating system may be executed, each guest system further characterized in that if a Start Interpretive Execution instruction is invoked, the Start Interpretive Execution instruction is intercepted and a corresponding function is performed in its place to simulate, for the guest program or operating system, the effect of the IBM S/390 computer architecture; whereby the guest program or operating system is able to execute transparently.

2. A method for executing at least two guest programs or operating systems each transparently on a single IBM S/390 computer architecture running an OS/390 operating system, the method comprising:

establishing for each guest program or operating system the IBM S/390 computer architecture;

intercepting an invocation by a guest system of a Start Interpretive Execution instruction;

performing in the place of the Start Interpretive Execution instruction a corresponding function to simulate, for the guest program or operating system, the effect of the IBM S/390 computer architecture; and restoring control to the guest system at a point just after the interception of the Start Interpretive Execution instruction.

* * * * *